March 22, 1966 E. D. CONROY 3,242,324

DATA TIMED MULTIPLICATION SYSTEM

Filed April 6, 1962 14 Sheets-Sheet 1

INVENTOR
EUGENE D. CONROY

BY Elmer Galbiati

ATTORNEY

FIG. 1B

| | |
|---|---|
| 10101 | MULTIPLICAND |
| x 11011 | MULTIPLIER |
| 1000110111 | PRODUCT |

FIG. 1C

| STEP | MULTIPLICAND | MULTIPLIER | PARTIAL SUM | |
|---|---|---|---|---|
| 1 | 10101 | 11011 | 00000 | BATCH OF DATA PASSED FROM INPUT MEANS 11 TO STAGE J. |
| 2 | | 1001[1] | 00000<br>10101<br>010101 | ADDITION PERFORMED BY STAGE J |
| 3 | 10101 | 1101 | 010101 | BATCH OF DATA PASSED FROM STAGE J TO STAGE K |
| 4 | | 110[1] | 10101<br>10101<br>111111 | ADDITION PERFORMED BY STAGE K |
| 5 | 10101 | 110 | 111111 | BATCH OF DATA PASSED FROM STAGE K TO STAGE L |
| 6 | | 11[0] | 111111<br>00000<br>0111111 | ADDITION PERFORMED BY STAGE L |
| 7 | 10101 | 11 | 0111111 | BATCH OF DATA PASSED FROM STAGE L TO STAGE M |
| 8 | | 1[1] | 0111111<br>10101<br>11100111 | ADDITION PERFORMED BY STAGE M |
| 9 | 10101 | 1 | 11100111 | BATCH OF DATA PASSED FROM STAGE M TO STAGE N |
| 10 | | [1] | 11100111<br>10101<br>1000110111 | ADDITION PERFORMED BY STAGE N |
| 11 | | | 1000110111 | BATCH OF DATA PASSED FROM STAGE N TO OUTPUT 12 |

March 22, 1966 E. D. CONROY 3,242,324

DATA TIMED MULTIPLICATION SYSTEM

Filed April 6, 1962 14 Sheets-Sheet 4

March 22, 1966 E. D. CONROY 3,242,324

DATA TIMED MULTIPLICATION SYSTEM

Filed April 6, 1962 14 Sheets-Sheet 7

"OR" CIRCUIT

DRIVER

March 22, 1966 E. D. CONROY 3,242,324

DATA TIMED MULTIPLICATION SYSTEM

Filed April 6, 1962 14 Sheets-Sheet 13

3,242,324

DATA TIMED MULTIPLICATION SYSTEM

Eugene D. Conroy, Poughkeepsie, N.Y., assignor to International Business Machines Corporation, New York, N.Y., a corporation of New York Filed Apr. 6, 1962, Ser. No. 185,689
20 Claims. (Cl. 235—164)

This invention relates to electronic digital computers and more particularly to electronic digital computers which operate asynchronously.

The components in an electronic digital computer can be divited into groups each of which performs a logical function. A group of components which can perform a particular logical function is hereinafter referred to as a section. During the operation of a digital computer batches of data are transferred through various selected sections of the computer and during the processing of any particular batch of data, the data sequentially goes through a plurality of different sections. The sections may be very complex such as logical adders, multipliers, etc. or they may be very simple sections such as simple gating matrices. However, irrespective of the complexity of the sections, in any digital computer batches of data must be sequentially transferred between various sections.

There are two ways in which the transfer of information between sections in a digital computer can be accomplished, i.e., synchronously where the transfer is controlled by a clock and asynchronously where the transfer is controlled by determining when the operation which the section is performing is complete and when the next section is ready to receive the data. One aspect of the present invention relates to a novel way of controlling the asynchronous transfer of batches of data between sections in a digital computer in order to achieve increased speed.

In the system of the present invention each section of the computer has a plurality of logical gating devices interconnected between a plurality of inputs and a plurality of outputs. Each input, each logical gating device and each output can be in three different states. These states are (1) a binary ONE state, (2) a binary ZERO state and (3) a NULL or indeterminate state.

After a particular section processes a batch of data the particular batch of data (as modified by the section) is passed on to the next section and all of the logical devices in this section and all of the outputs of the section are forced into the NULL state. With the system of the present invention the time at which a batch of data is gated from a previous section into a particular section is determined by monitoring the previous section to determine when it has completed processing a particular batch of data (so that we know that a valid batch of data is available at the output of the previous section) and monitoring the particular section to determine when it is ready to receive a new batch of data.

The present invention includes novel means for controlling the transfer of batches of data between sections, novel means for nullifying each section after the outputs of the section have been used, novel gating means for gating batches of data between sections and novel AND and OR blocks which facilitate the development of NULL signals.

With the present invention each batch of data consists of a plurality of binary bits. Each section has a plurality of outputs, each of which indicates the state (i.e., ONE, ZERO or NULL) of one particular bit of data. Each output consists of three lines (each of which can either have current or no current therein). Hence, the three states of a bit of data (i.e., ONE, ZERO and NULL) are respectively represented by current in a first line, current in a second line and current in the third line. As previously stated, each section of the system is designed to perform a particular logical operation upon a batch of data which is supplied to inputs of the section. When a particular batch of data is supplied to the inputs of a particular section of the system the section operates upon the batch of data and generates a modified batch of data at its outputs. After a section is through processing a batch of data, there will not be current in any of the NULL lines at the output of the section, since each output bit will be determined and therefore each output of the section will either be in the ZERO state or the ONE state. Hence, by sampling the NULL lines at the output of a section, a determination can be made as to when the section has completed processing a batch of data which was supplied to its inputs.

Intersection gates are provided between the various logical sections. These intersection gates perform three functions. FIRST, they prevent the output from one logical section from being transferred to the input of another logical section before the system has determined that such a transfer can be made. As previously stated, a batch of data can only be transferred from the output of a first logical section to the input of a second section after (a) the first logical section has indicated that it has completed the logical operation which it was designated to perform, and (b) the second section has indicated that it is ready to receive a new batch of data. SECOND, once a batch of data has been transferred from the output of one section to the input of another section, the intersection gates which are between the two sections provide steady inputs to the second section irrespective of whether the outputs from the first section change. THIRD, after a batch of data is transferred from a particular section to the following section, the intersection gates associated with the particular section set the inputs of the particular section to the NULL state.

Each section also includes a control circuit which controls the intersection gates at the input of the section. Each control circuit monitors the associated and the previous section to determine when (1) all of the outputs of the particular section are in the NULL condition, (2) all of the circuits in the particular section are in the NULL state, i.e., the particular section is not then processing a batch of data, (3) the outputs of the previous section are indicating a valid batch of data and (4) the outputs of the previous section are indicating a new batch of data.

When each of the above conditions are fulfilled the associated section is ready to receive a new batch of data and the preceding section has a valid output, hence, a transfer is initiated.

Another feature of the present invention is that after a particular section has completed processing a batch of data, NULL signals are inserted at the inputs of the section and at a plurality of places in the section. This results in a section being nullified more quickly than would be possible if NULL signals were merely applied to the inputs of the section and allowed to propagate serially through the entire section to the outputs thereof.

The present invention also includes a novel multiplication device constructed in accordance with the above principles. In the novel multiplication device of the present invention a binary multiplicand is multiplied by a binary multiplier in a plurality of sections of logic. Each section of logic is used to examine one bit of the multiplier and (1) to add the multiplicand to a previously developed partial sum if the bit which is examined is a ONE or (2) to add ZERO to the previously developed partial sum if the bit which is examined is a ZERO.

A batch of data which represents the multiplier, the multiplicand and an initial partial sum (which is ZERO if a conventional multiplication is being performed) is transferred to the first section. This first section examines the first digit of the multiplier and if this digit of the multiplier is a ONE it adds the multiplicand to the initial partial sum and if this digit of the multiplier is a ZERO it passes the initial partial sum to its output unchanged. The partial sum generated by the first section, the remaining digits of the multiplier, and the multiplicand are a new batch of data which is passed on to the next section. After the first batch of data is passed to the second section, the first section can receive another batch of data and begin a second multiplication. When the second section receives a batch of data which represents a partial sum, a multiplicand and the remaining digits of a multiplier, it examines the lowest digit of the multiplier which it received and if the digit is a ONE it adds the multiplicand to the partial sum which it received. If the digit is a ZERO it passes the partial sum to its output unchanged. This new batch of data is then passed on to another section and the process is repeated.

The various sections of multipliers form a pipeline which can simultaneously perform a plurality of different multiplications. Each section of the pipeline performs a particular part of a multiplication and after it completes its part of the multiplication it passes the data to the next section (if the next section is ready to receive the data). After a section passes a batch of data to the next section it goes through a NULL state and it then is ready to receive a new batch of data. The timing of the transfer of information between the various sections of the multiplier is controlled as previously described.

An object of the present invention is to provide an improved asynchronous computing system.

A further object of the present invention is to provide an improved data timed computing system.

A still further object of the present invention is to provide an improved computing system with a plurality of interconnected sections where data is transferred from one section to the next section when the first section has a valid batch of data on its outputs which has not previously been transferred to the next section and when the next section is ready to receive a new batch of data.

Another object of the present invention is to provide a computing system with a plurality of interconnected sections where data is transferred from one section to the next section when (1) all of the outputs of the particular section are in the NULL condition, (2) the particular section is not then processing a batch of data, (3) the outputs of the previous section are indicating a valid batch of data and (4) the outputs of the previous section are indicating a new batch of data.

Still another object of the present invention is to provide an improved intersection gate for controlling the flow of information in a computing system.

Yet another object of the present invention is to provide an improved intersection gate for controlling the flow of information in a computing system which has a plurality of interconnected sections, said gate performing gating, latching and nullifying functions.

Yet another object of the present invention is to provide a control circuit for timing the flow of data through a computing system which has a plurality of interconnected sections, the data being transferred from one section when (1) all of the outputs of a particular section are in the NULL state, (2) a particular section is not then processing a batch of data, (3) the outputs of the previous section are indicating a valid batch of data and (4) the outputs of a previous section are indicating a new batch of data.

Yet another object of the present invention is to provide an improved device for performing multiplication.

Another object of the present invention is to provide a device for simultaneously performing a plurality of multiplications.

Another object of the present invention is to provide a device which can asynchronously perform a plurality of multiplications.

Still another object of the present invention is to provide an improved AND circuit.

A still further object of the present invention is to provide a circuit for generating the AND function of two variables each of which have ONE, ZERO and indeterminate states.

Still another object of the present invention is to provide an improved AND circuit which has a NULL input and a NULL output.

Yet another object of the present invention is to provide an improved OR circuit.

A further object of the present invention is to provide an improved circuit for generating the OR function of two variables, each of which have ONE, ZERO and indeterminate states.

Yet another object of the present invention is to provide an improved OR circuit which has a NULL input and a NULL output.

Yet another object of the present invention is to provide an improved circuit for generating the OR function of two variables each of said variables having ZERO, ONE and NULL states wherein the ONE state of one of the variables overrides the NULL state of the second variable.

Still another object of the present invention is to provide an improved means of setting circuitry to the NULL state.

A still further object of the present invention is to provide a computing system with a plurality of interconnected sections which has means for quickly setting an entire section to the NULL condition.

The foregoing and other objects, features and advantages of the invention will be apparent from the following more particular description of preferred embodiments of the invention, as illustrated in the accompanying drawings.

FIGURE 1B is an example of a multiplication which can be performed.

FIGURE 1C is a chart showing how the multiplication shown in FIGURE 1B is performed.

Figures 2, 2A:
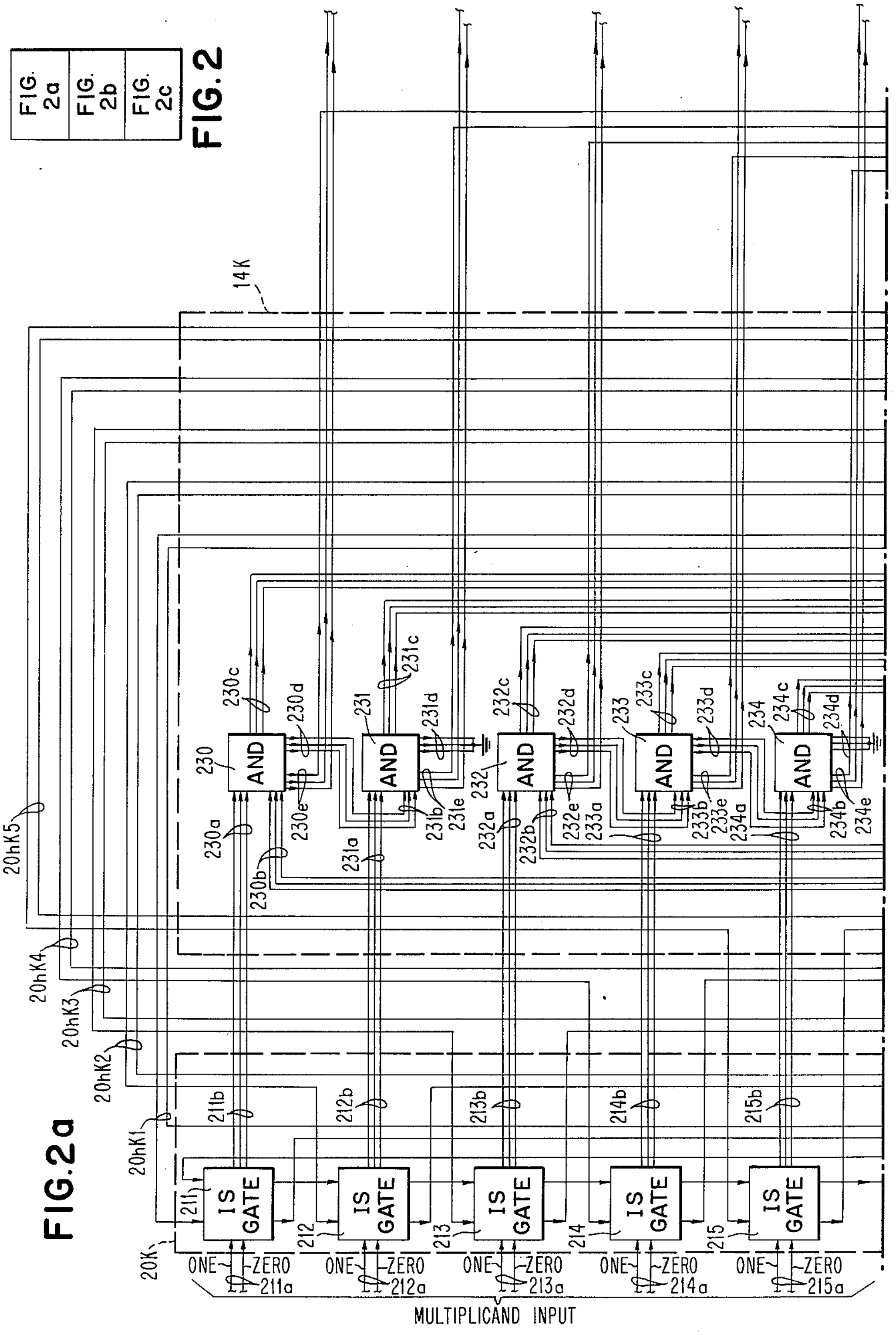
Figure 2B:
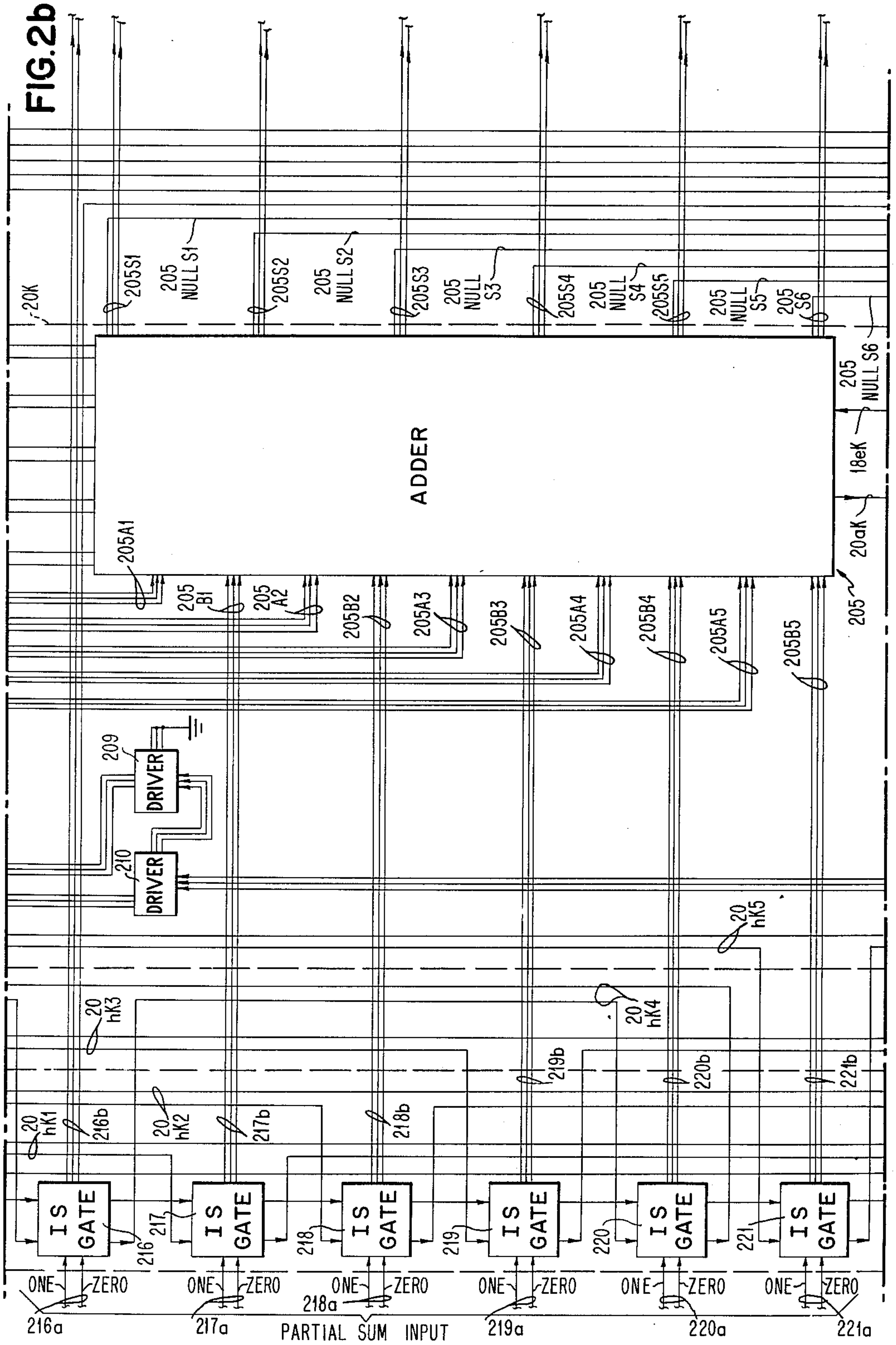
Figure 2C:
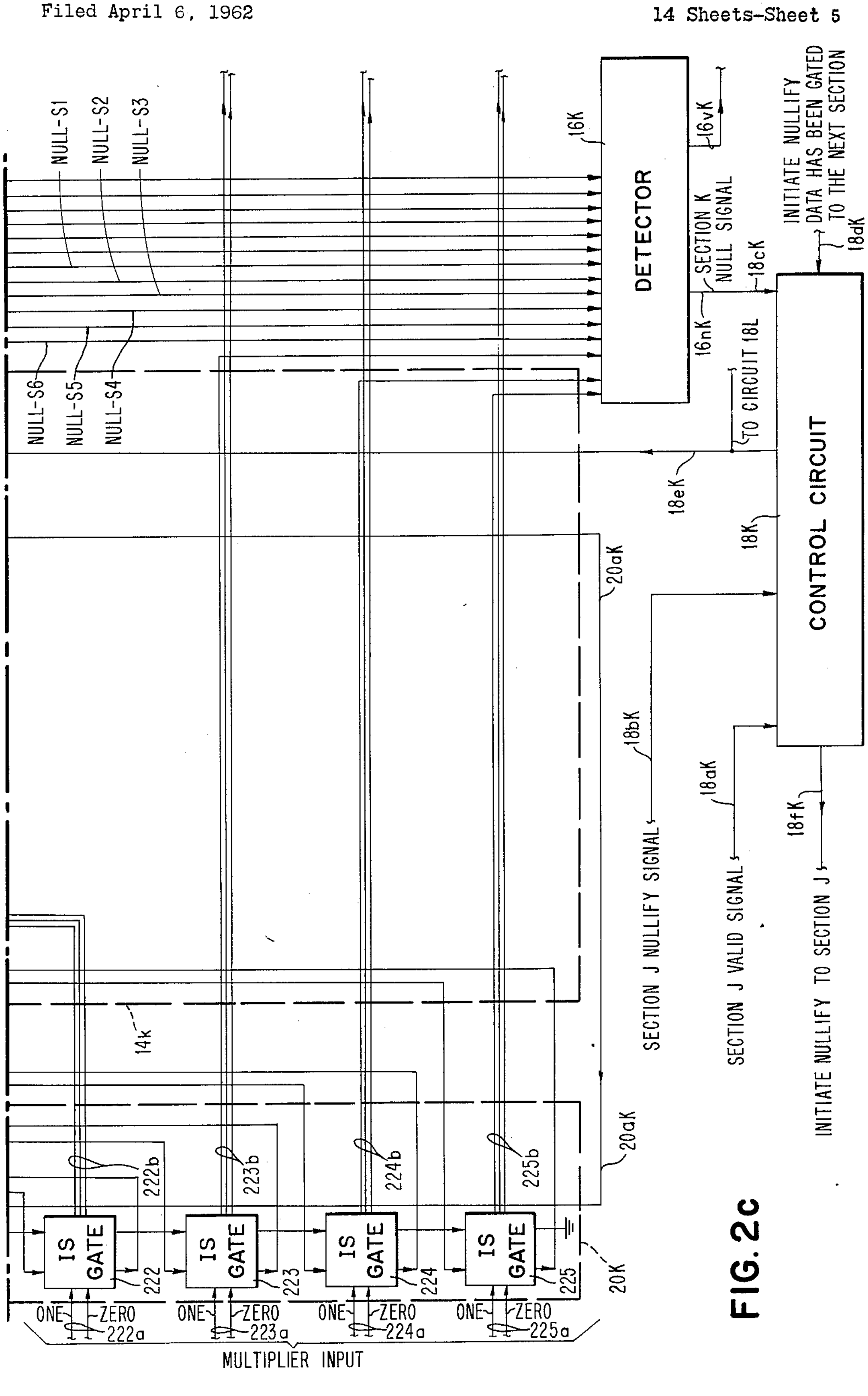

FIGURES 2*a*, 2*b* and 2*c* (which fit together as shown in FIGURE 2) are a more detailed block diagram of section K.

Figures 3, 3A:
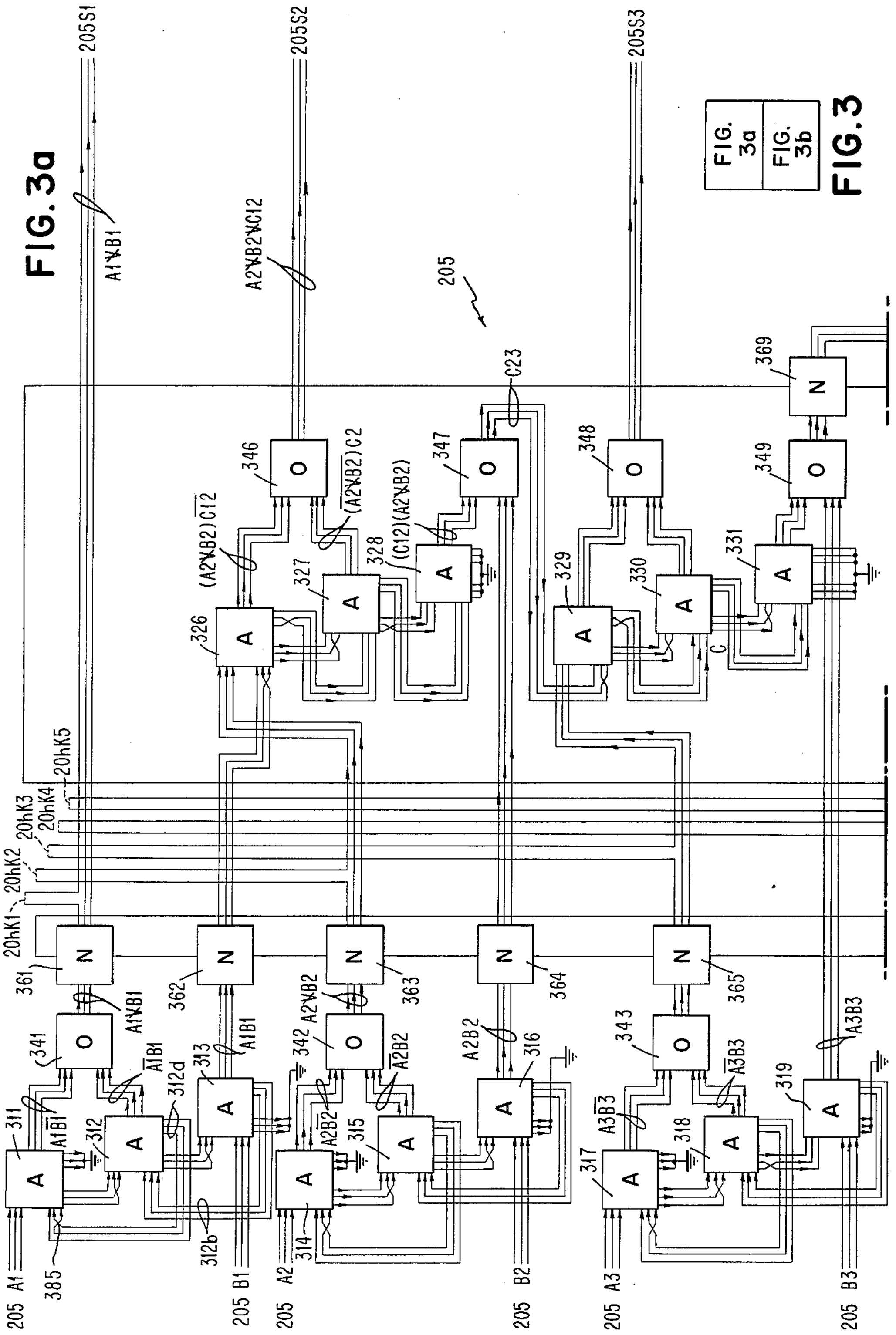
Figure 3B:
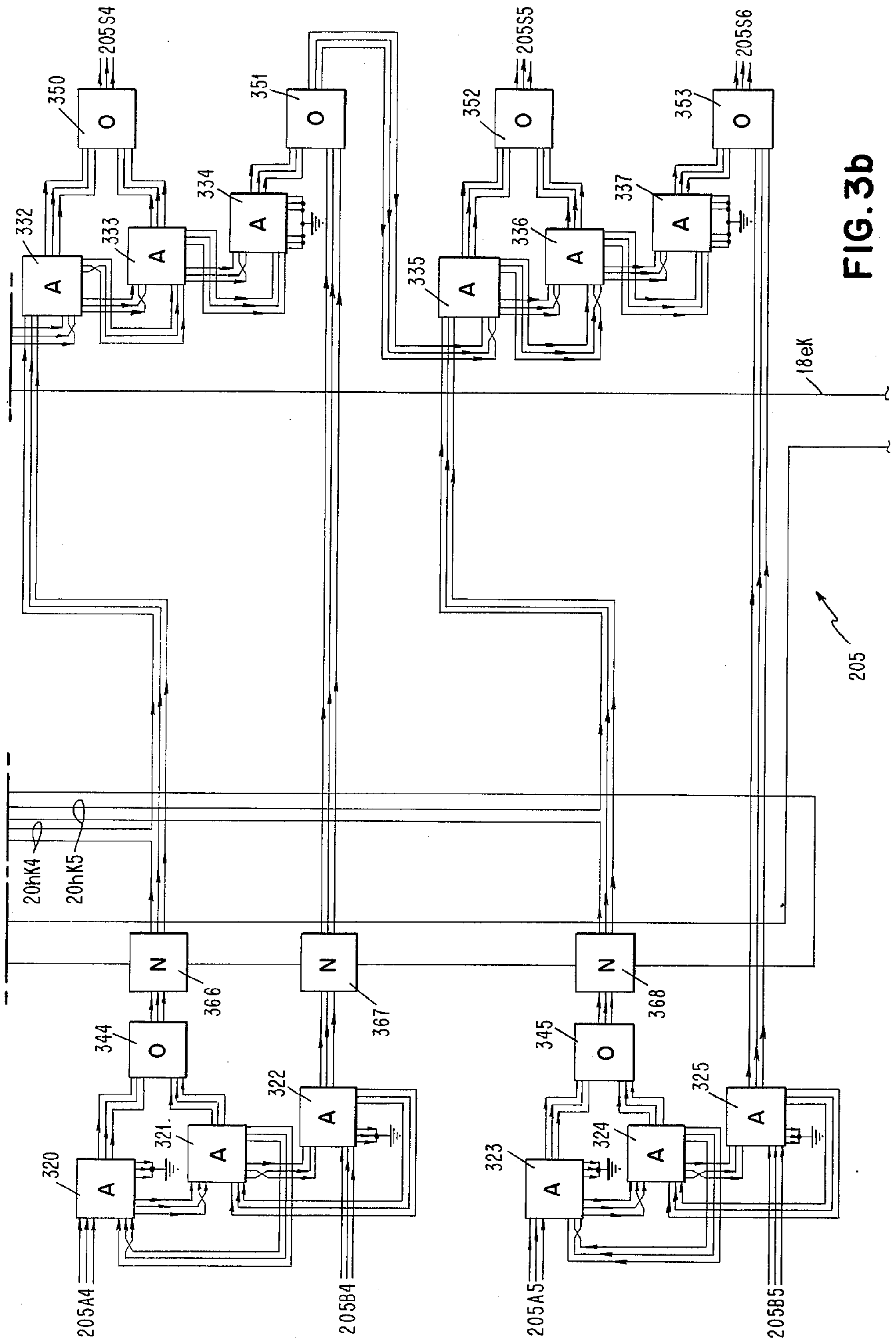

FIGURES 3*a* and 3*b* (which fit together as shown in FIGURE 3) are a block diagram which shows the details of the adder shown in FIGURE 2*b*.

Figure 4:
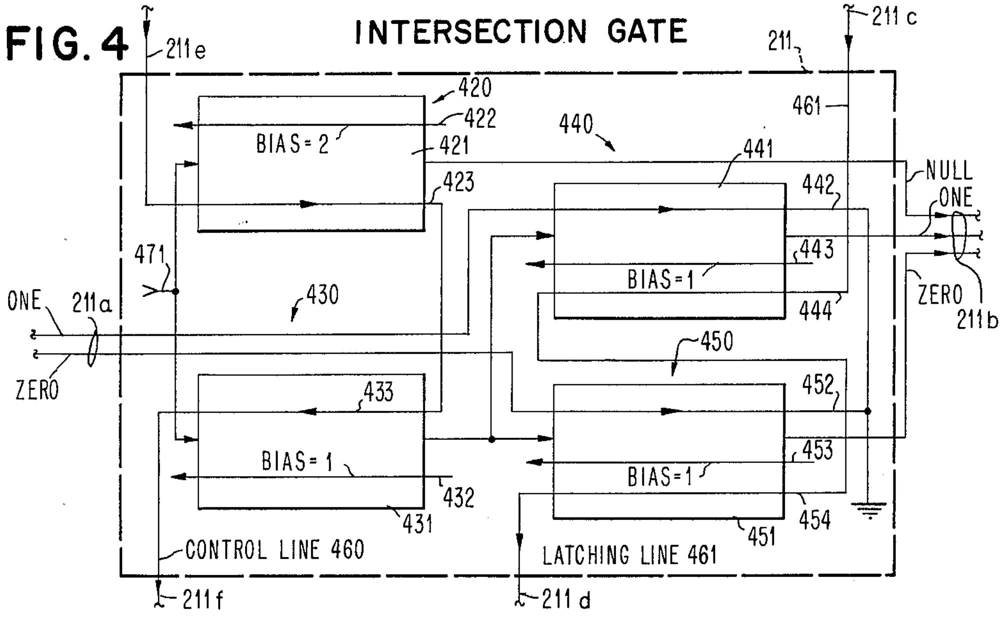

FIGURE 4 is a detailed circuit diagram of one of the intersection gates shown in FIGURES 2*a*, 2*b* and 2*c*.

Figure 5:
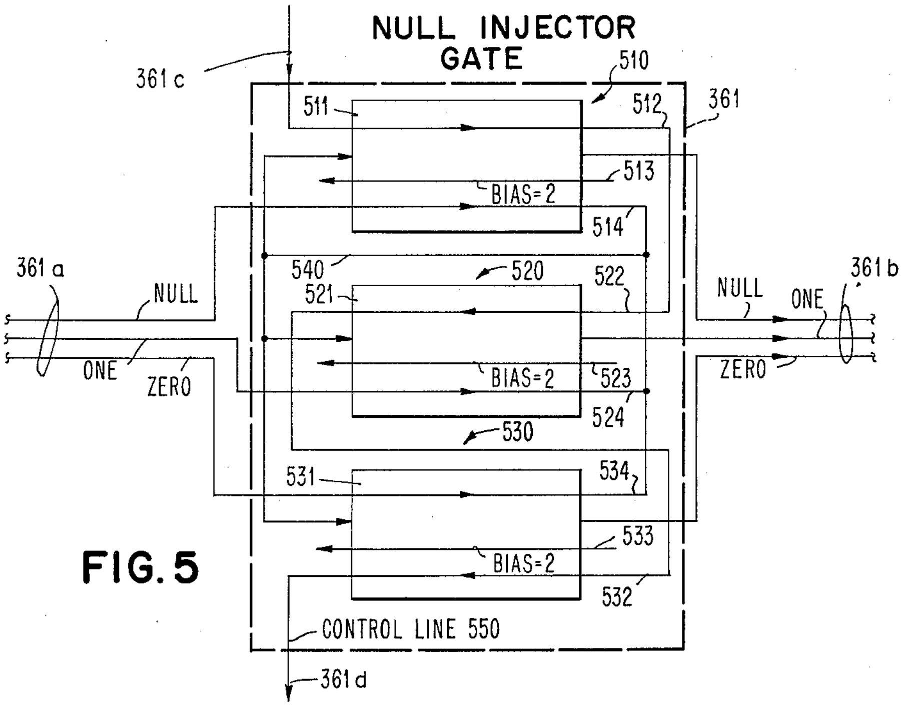

FIGURE 5 is a detailed circuit diagram of one of the NULL injector gates shown in FIGURES 3*a* and 3*b*.

Figure 6A:
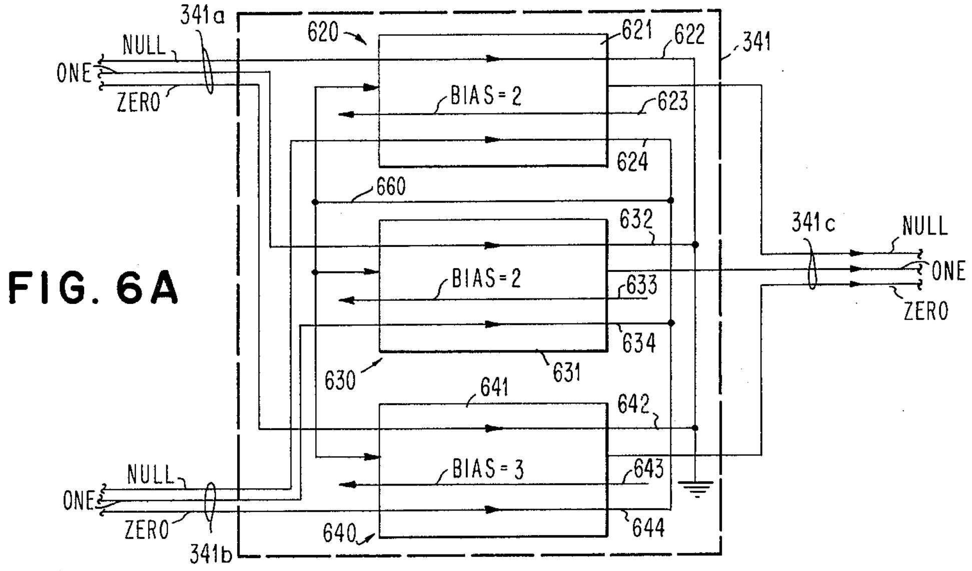

FIGURE 6A is a detailed circuit diagram of one of the OR circuits shown in FIGURES 3*a* and 3*b*.

Figure 6B:
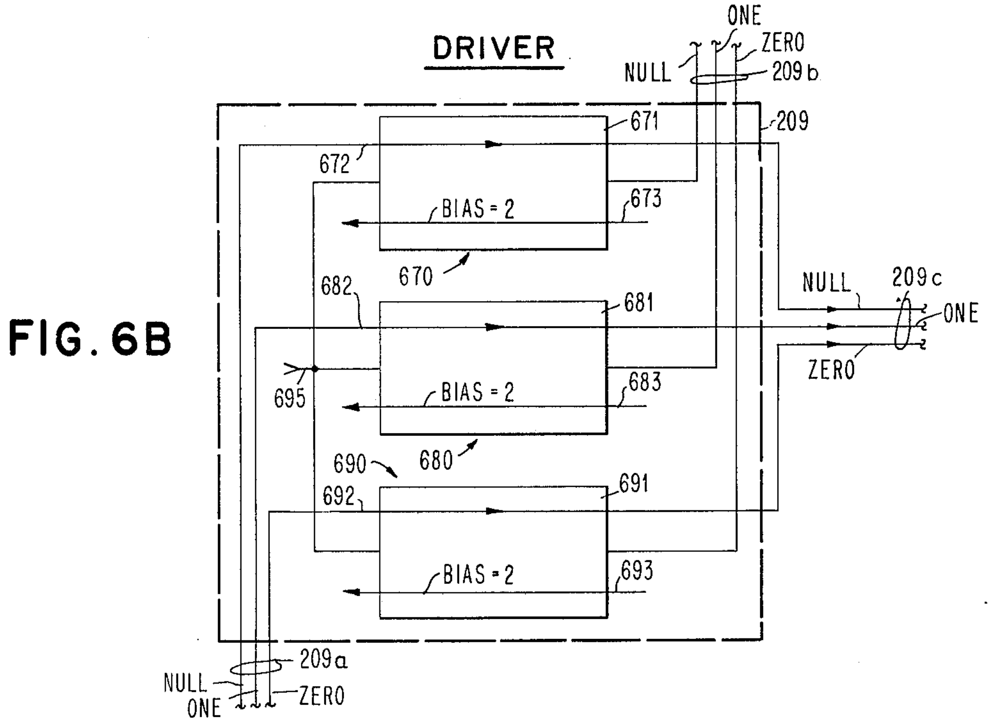

FIGURE 6B is a detailed circuit diagram of one of the driver circuits shown in FIGURE 2*b*.

Figure 7:
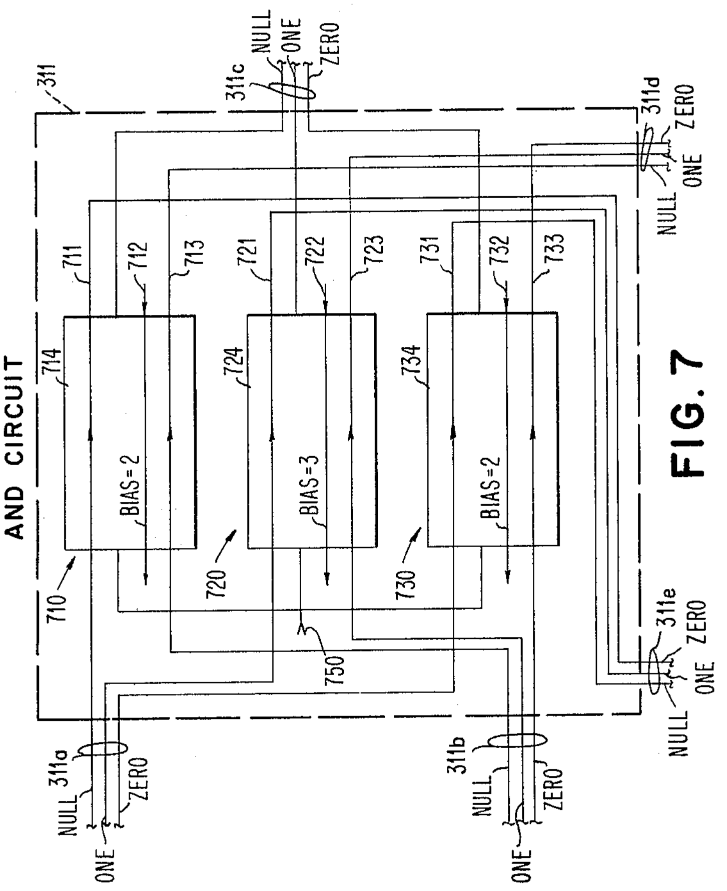

FIGURE 7 is a detailed circuit diagram of one of the AND circuits shown in FIGURES 2*a*, 3*a* and 3*b*.

Figures 7A, 7B:
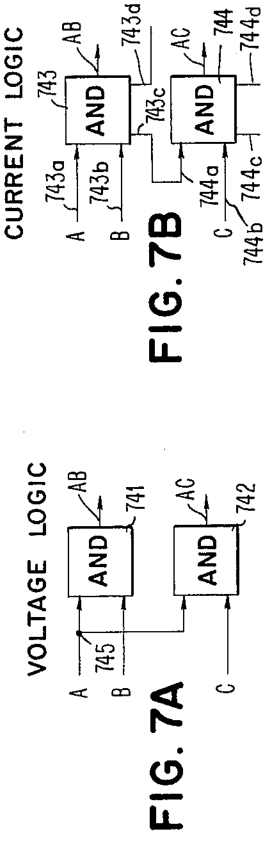

FIGURES 7A and 7B show the different types of connections needed for voltage and current logic.

Figure 1A:
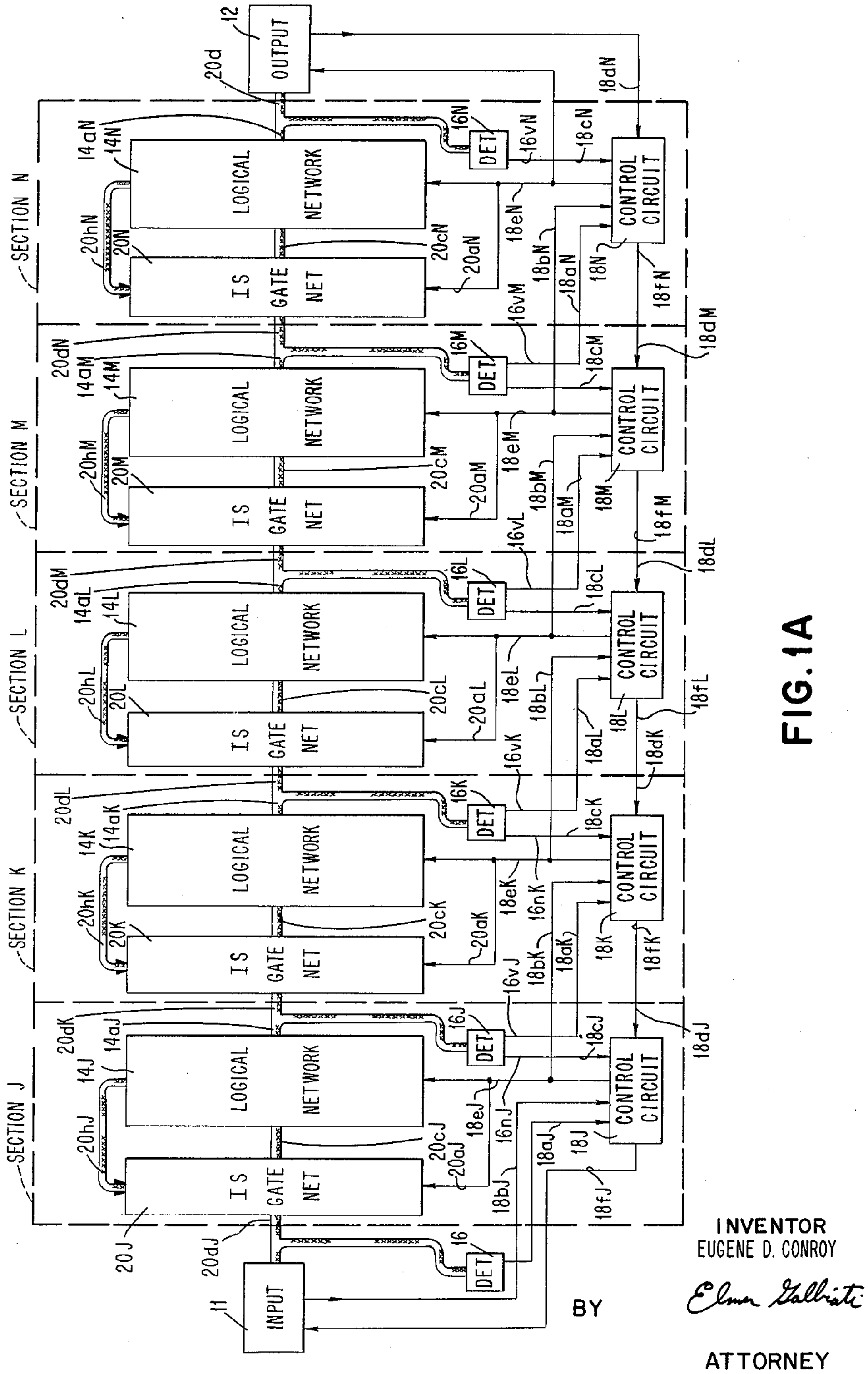
FIGURE 1A is an overall block diagram which shows the flow of information and control signals.
Figure 8:
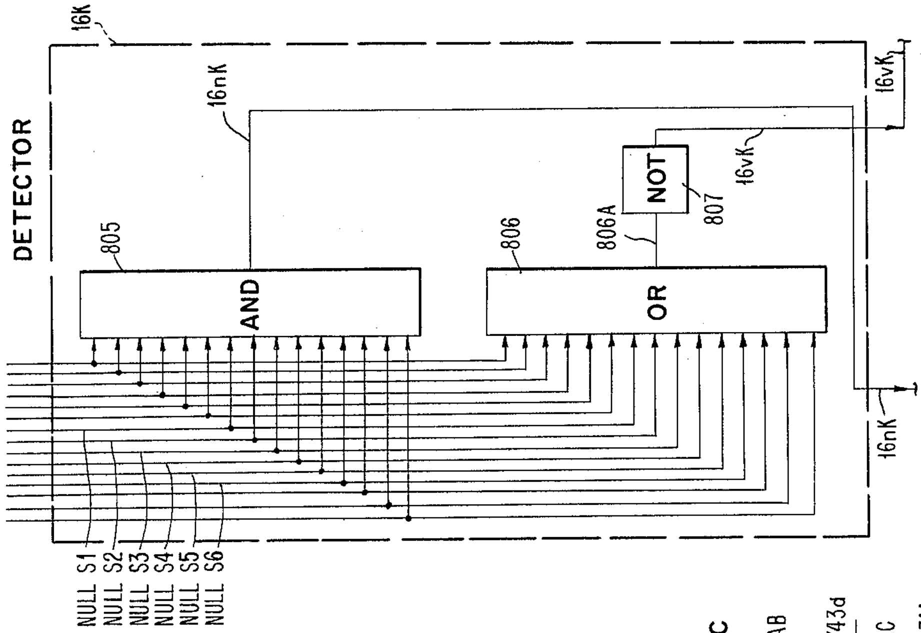

FIGURE 8 is a logical circuit diagram of the detector circuit shown in FIGURES 1A and 2C.

Figure 9A:
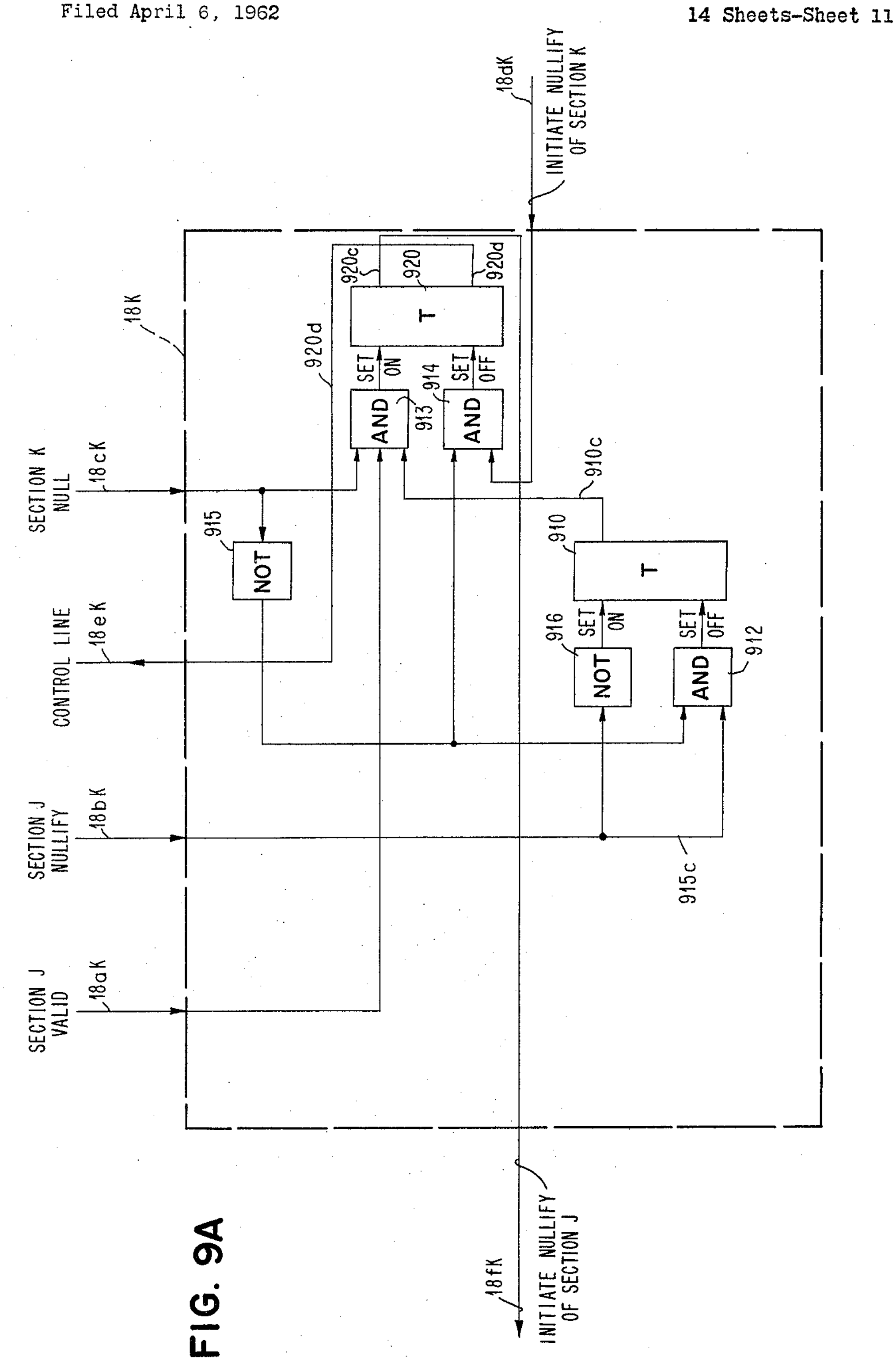

FIGURE 9A is a logical diagram of the control circuit.

Figure 9B:
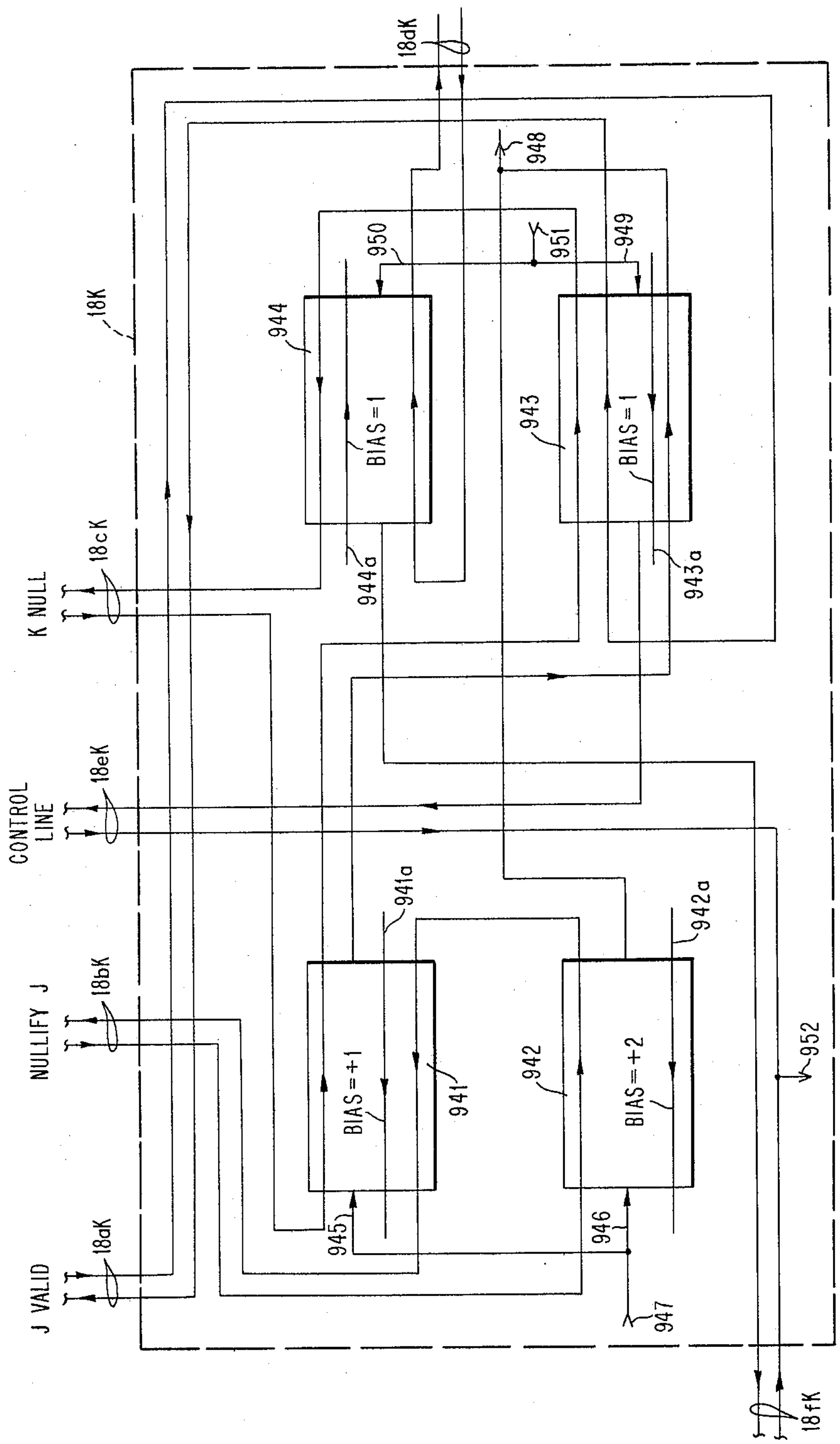

FIGURE 9B is a circuit diagram of the control circuit.

Figure 10:
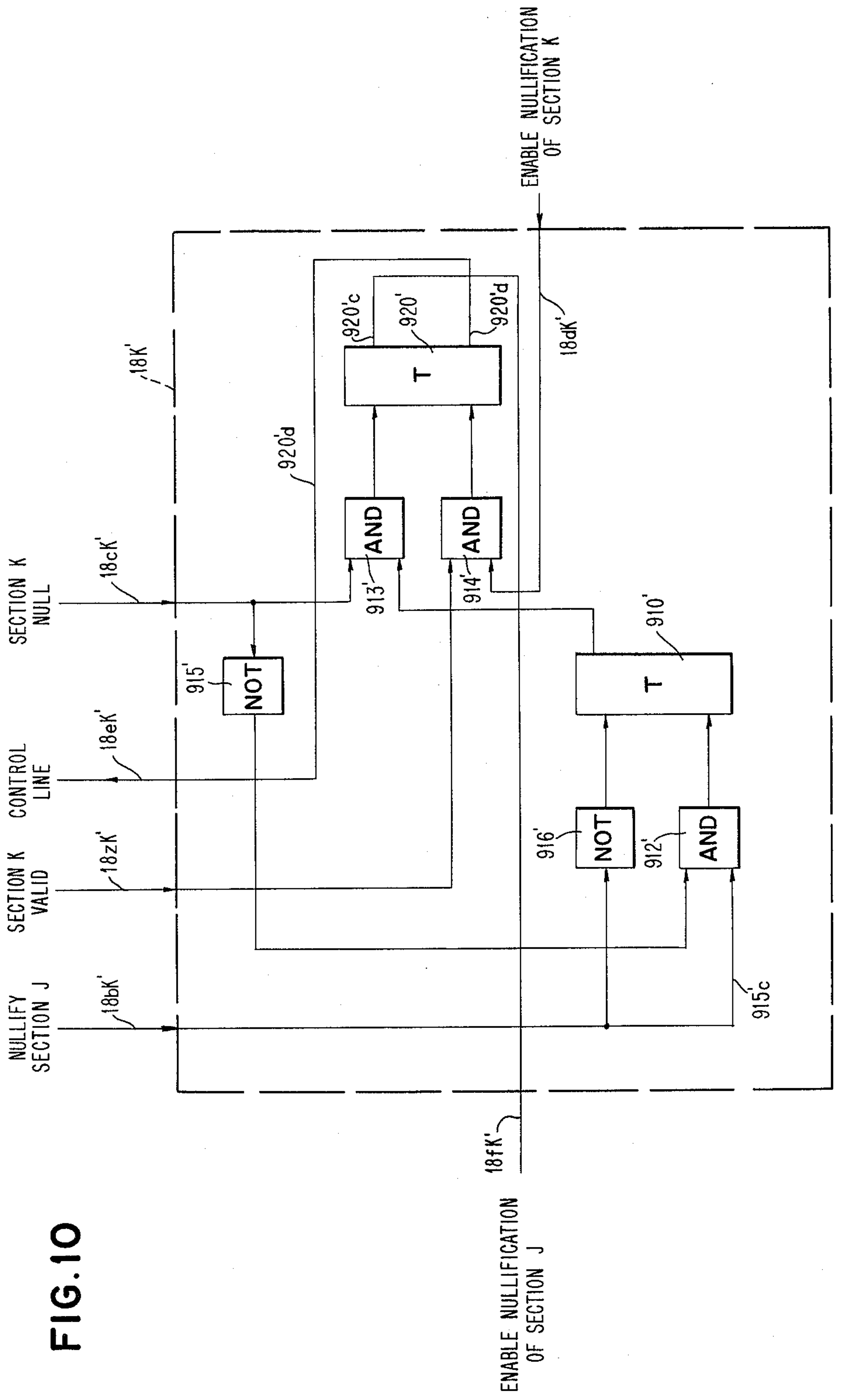

FIGURE 10 is a logical circuit diagram of the control circuit for an alternate embodiment of the invention.

Figure 11:
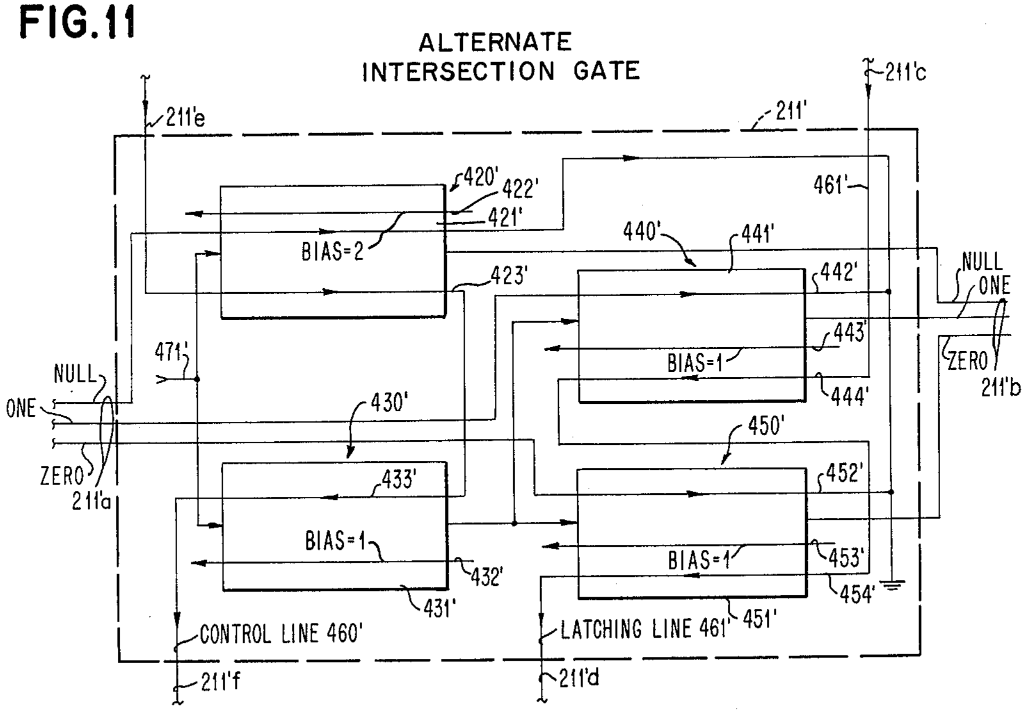

FIGURE 11 is a circuit diagram of an intersection gate for the second embodiment of the invention.

Figure 12:
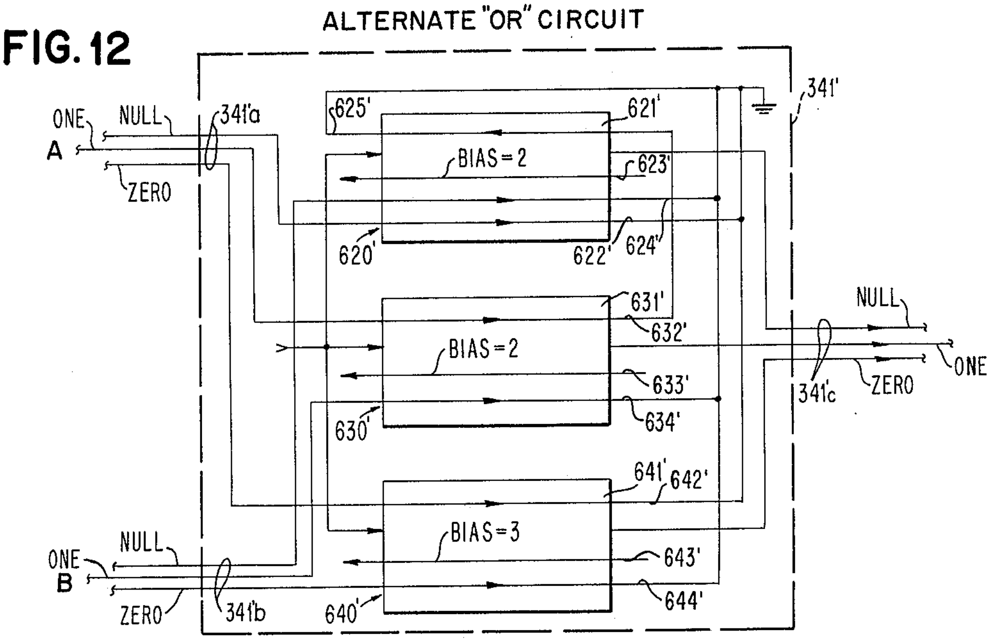

FIGURE 12 is a circuit diagram of an alternate type of OR circuit.

The preferred embodiment of the invention shown herein is a system for performing multiplication. As shown in FIGURE 1A the system has an input means 11, five sections which are respectively designated section J to section N, and an output means 12. Each of the sections J to N includes a logical network 14, a detector 16, a control circuit 18, an intersection gate network 20 (designated IS GATE NET in FIGURE 1). The components in each section are identical and a particular component of a particular section is identified by a number to identify the type of component followed by a letter to identify the section with which it is associated. For example, the control circuit in section K is designated 18K and the corresponding control circuit in section J is designated 18J.

The system shown in FIGURE 1A is capable of performing a binary multiplication such as that shown in FIGURE 1B. The multiplication is performed in the eleven steps shown in FIGURE 1C. The operation which occurs during each step is set out below:

First step: The multiplicand, the multiplier and a partial sum consisting of all ZEROS are passed from input 11 to stage J.

Second step: The section J examines the lower order digit of the multiplier and since the lower order digit of the multiplier is a ONE it adds the multiplicand to the partial sum which it received (note, the digit of the multiplier which is examined is encircled by a dotted line in FIGURE 1B).

Third step: The multiplicand, the remaining digits of the multiplier and the partial sum produced in step two are passed from stage J to stage K.

Fourth step: The next lower order digit of the multiplier is examined and since this digit is a ONE the multiplicand is added to the previous partial sum and a new partial sum is developed.

Fifth step: The multiplicand, the remaining digits of the multiplier and the partial sum produced in step four are transferred to stage L.

Sixth step: The next lower order digit of the multiplier is examined and since this digit is a ZERO nothing is added to the previously produced partial sum.

Seventh step: The multiplicand, the remaining digits of the multiplier and the partial sum is transferred from stage L to stage M.

Eighth step: The next lower order digit of the multiplier is examined and since this digit is a ONE the multiplicand is added to the previously produced partial sum and a new partial sum is generated.

Ninth step: The multiplicand, the remaining digits of the multiplier and the partial sum generated in step eight are transferred from stage M to output N.

Tenth step: The next lower order digit of the multiplier is examined and since this digit is a ONE the multiplicand is added to the previously developed partial sum and a new sum is developed.

Eleventh step: The sum is transferred from section N to output 12. It should be noted that except for the time when a partial sum is being transferred from one section to another section only one section of the system is being used to perform the multiplication. The other sections of the multiplier could be engaged in performing other multiplications during this time.

The system can be viewed as a pipeline having five sections, J to N. A batch of data which represents a multiplier and a multiplicand is entered into the input 20*d*J of section J and section J performs a logical operation upon this batch of data and it produces a modified batch of data on its output 14*a*J which represents the remaining digits of the multiplier, a partial sum and the multiplicand. The next section in the pipeline, section K, receives this batch of data and generates a new partial sum which together with the multiplicand and the remaining digits of the multiplier represents a batch of data which appears at the output 14*a*K of the section K. The batch of data continues to be transferred through the remaining sections of the pipeline until the desired product appears on the output of the last section. After a particular batch of data has been transferred from one section to the next section the first section can begin processing another batch of data.

No specific amount of time is allocated to each section during which it must perform its required operations. If a specific amount of time were allocated to each section, an amount of time equal to the worst possible case condition would have to be allocated. Instead with the present system each section can operate as rapidly as possible, and when a batch of data which represents a valid output appears at the output of a section this batch of data is transferred to the next section as soon as the next section is ready to receive the data. The system therefore operates asynchronously. Stated differently, the system is data timed since the control of the transfer of data between sections is controlled by the data itself as it affects the output of a section.

The addition which each stage performs is performed by the logical network 14 which is included in each stage. The logical networks 14 are separated by IS gate networks (intersection gate networks) 20, each of which has a plurality of inputs 20*d*, a plurality of outputs 20*c*, a control line 20*a* and a plurality of latching lines 20*h*. Note, in FIGURE 1 the inputs and outputs of each intersection gate has a designation to identify the particular input or output followed by a letter which designates the particular section with which the gates is associated. For example, one input to intersection gate network 20 in section K is designated 20*d*K and the corresponding input in section J is designated 20*d*J.

Each intersection gate network 20 performs three functions. FIRST, when current is flowing in the associated control line 20*a* each intersection gate network 20 sets all of the inputs of the logical network 14 which is in the same section to the NULL condition. SECOND, when no current is flowing in the associated control line 20*a* each intersection gate network 20 transmits signals received at its inputs 20*d* to its outputs 20*c*, and THIRD, when a signal is supplied to (i.e., when current is removed from) the associated latching lines 20*b* the outputs 20*c* of an intersection gate network become insensitive to the changes in the inputs 20*d*. The third function is a latching operation. The functions which each intersection gate network 20 perform are summarized in the following table.

| State of Inputs | Functions Performed |
|---|---|
| Current in line 20*a* and either current or no current in lines 20*h*. | All of the outputs 20*c* are set to the NULL state. |
| No current in input 20*a* and current in lines 20*h*. | The outputs 20*c* are responsive to the inputs 20*d*. |
| No current in input 20*a* and no current in lines 20*h*. | The outputs 20*c* are nonresponsive to further changes in the inputs 20*d*. |

Each section J to N includes a detector 16 and a control circuit 18. Each detector 16 has two outputs 16*n* and 16v. Output 16*n* is activated when each of the outputs of the associated logical section is in the NULL state and output 16*v* is activated when none of the outputs of the associated section is in the NULL state. That is, output 16*v* is activated when each of the outputs of the associated section is either in the ZERO state or in the ONE state.

Control circuits 18 are sequential circuits. That is, the output of each control circuit 18 at any particular time is not only dependent upon the inputs to the particular circuit at the particular time but the outputs are also dependent upon the previous states through which the inputs of the circuit have progressed (see Switching Circuits by Caldwell, Prentice Hall, 1958).

Control circuits 18 control or time the flow of batches of data between the various sections. Each control circuit 18 also controls the setting of the intersection gate network 20 and the logical network 14 which is the associated section to the NULL condition after a batch of data is transferred from the associated section to the next section in the system.

The persent general discussion will merely describe the conditions which must prevail before a control circuit will allow a batch of data to be transferred from the output of the previous section into the intersection gate network of the associated section. The details of the circuitry in each of the control circuits 18 will be described later. A control circuit allows a batch of data to be transferred from the outputs of the previous section through the intersection gate network of the associated section when:

(1) All of the outputs of the associated section are in the NULL condition.

(2) The associated section is not then processing a batch of data or stated differently, all of the circuitry in the associated section is in the NULL state.

(3) The outputs of the previous section are indicating a valid batch of data; and (4) The outputs of the previous section are indicating a new batch of data.

When each of the above conditions is fulfilled, a control circuit knows that the (a) associated section is ready to receive a new batch of data, (b) that there is a valid batch of data appearing on the output of the previous section and (c) that the batch of data which appears on the output of the previous section has not been previously transferred to the associated section. Hence, when the four conditions set out above are fulfilled, a control circuit allows a batch of data which appears upon the outputs of the previous section to be gated into the associated sections so that the associated section can begin processing this batch of data.

Another function which the control circuit which is associated with each section performs is that after the section finishes processing a batch of data and the outputs of the section have been gated into the next section, the associated control circuit initiates the nullification of all of the circuitry in the section.

Each control circuit 18 has four inputs **18*a*, 18*b*, 18*c* and 18*d*, and two outputs 18*e* and 18*f*. Input 18*a* is activated by the detector 16 which is in the previous section, input 18*c* is activated by the detector 16 in the same section, input 18*d* is activated by output 18*f* of the control circuit 18 in the following section and input 18*b* is activated by output 18*e* of the control circuit 18** in the preceding section. Each of the inputs is activated under the following conditions:

Input **18*a* is activated when each of the outputs of the logical network 14 in the preceding section is either in the ONE or in the ZERO condition, that is, when none of the outputs of the logical network 14** which is in the preceding section is in the NULL condition.

Input **18*b* is activated when the control circuit 18** in the preceding section is nullifying the circuitry in the preceding section.

Input **18*c* is activated when each of the outputs of the logical network 14 which is associated with the same section is in the NULL condition, that is, when none of the outputs of the logical network 14** which is in the same section is in either the ONE or in the ZERO condition.

Input **18*d* is activated after a batch of data has been transferred from the associated logical section to the following logical section and input 18*d* remains active until control circuit 18** in the following sections begins to nullify the circuitry in the following section.

Each control circuit 18 activates its outputs in a manner which will be explained in detail later under the following conditions:

Output **18*e* is activated after a batch of data has been transferred from the associated section to the following section and output 18*e* of the control circuit 18** in each section remains active until the control circuit determines that all of the conditions are ready for the transfer of another batch of data into the associated section.

Output **18*f* is activated after a batch of data is transferred from the previous section to the associated section and output 18*f*** remains active until after the data received by the associated section is transferred to the following section.

The function which each control circuit 18 performs will be explained by explaining the functions which control circuit 18K performs. By monitoring inputs **18*a*K and 18*b*K control circuit 18K can tell (a) when all the circuitry in the logical network 14J in the section J is being set to the NULL condition by control circuitry 18J and (b) when the outputs of the logical network 14J are all in either the ONE or in the ZERO state thereby indicating valid data. Control circuit 18K detects when the outputs of the section J go from the NULL condition to the valid condition and when this occurs it knows that a new batch of data is present on the output of the section J and that this data is ready to be gated into the logical network 14K. By monitoring input 18*c*K which tells the control circuit when all of the outputs of the logical network 14K are in the NULL condition, control circuit 18K knows when the section K is ready to receive a batch of data from the section J. When the logical network 14K is ready to receive a new batch of data from the section J control circuit 18K deactivates output 18*e*K and (in a manner which will be explained in detail later) this allows the batch of data to be gated from the outputs of logical network 14J through the intersection gate network 20K into the logical network 14K. After a batch of data is gated into a logical network 14K the logical network K processes this batch of data and some time later a valid batch of data appears on the output of logical network K. The control circuit in the section L detects this and gates this batch of data into section L when section L is ready to receive a new batch of data. The control circuit 18L then signals the control circuit 18K via its output 18*f*L which activates input 18*d*K of the control circuit 18K. When input 18*d*K is activated control circuit 18K knows that the data previously processed by section K has been gated to section L and hence it activates output line 18*e*K** which sets all of the circuitry in section K to the NULL condition thereby preparing section K to receive another batch of data. The cycle is then repeated.

Since the circuitry in each of the logical sections J to N is practically identical, only the circuitry in section K will be explained in detail and the minor differences between the circuitry in section K and the circuitry in the other sections will be pointed out.

*Circuitry in Section K*

The details of the circuitry in intersection gate network 20K and some of the details of the circuitry in logical network 14K are shown in FIGURES 2*a*, 2*b* and 2*c* (which fit together as shown in FIGURE 2).

Intersection gate network 20K consists of fifteen intersection gates, 211 to 225 (each intersection gate is identified on the drawings by the designations "IS GATE") and the logical network 14K consists of adder 205, AND circuits 230 to 234 and driver circuits 209 and 210.

The details of the circuitry in each intersection gate 211 to 225 is shown in FIGURE 4, the details of the circuitry in adder 205 are shown in FIGURES 3*a* and 3*b* (which fit together as shown in FIGURE 3), the details of AND circuits 230 to 234 is shown in FIGURE 7 and the details of driver circuits 209 and 210 are shown in FIGURE 6B.

Intersection gate network 20K includes three groups of gates (1) intersection gates 211 to 225 which receive the digits of the multiplicand from section J (2) intersection gates 216 to 221 which receive the digits of the partial sum from section J and (3) intersection gates 222 to 225 which receive the digits of the multiplier from section J. The logical network 14K examines the multiplier bit received via intersection gate 222 and if this bit is a ONE the multiplicand receive via intersection gates 211 to 214 is gated through AND circuits 230 to 235 to adder 205 and adder 205 adds the multiplicand to the digits of the partial sum received via intersection gates 217 to 221. If the multiplier bit received via intersection gate 222 is a ZERO, the output of each of the AND circuits 230 to 235 is set to the ZERO state and hence, adder 205 merely adds ZERO to the digits of the partial sum received via intersection gates 217 to 221.

By examining FIGURE 1C (step four) it can be seen that the lower order digit of the partial sum which section K receives from section J is unchanged by section K and the same digit which section K receives from section J is transmitted to section L during step five. Section K receives the lowest order digit of the partial sum from section J through intersection gate 216. By examining FIGURE 2*b* it can be seen that the output of intersection gate 216 does not go to adder 205 but instead it goes directly through logical network 14K to the output of section K. Likewise, by examining FIGURE 1C it can be noted that the digits of the multiplier which section K receives from section J (other than the digit which is examined by section K) are transmitted from section K to section L without change. That is, the three higher order digits of the multiplier which section K receives from section J are transmitted unchanged from section K to section L. Section K receives the three high order bits of the multiplier via intersection gates 223 to 225. Since section K does not perform any operation upon these bits they are transmitted directly from the output of intersection gates 223 to 225 through logical network 14K to the output of section K.

The only difference between section K and each of the other sections in the system is that in each section different bits are transmitted through the section without change. For example, by examining FIGURE 1C it can be noted that in step four no operation is performed upon the least significant digit of the partial sum. Hence, as explained above this digit is transmitted directly from the output of one of the intersection gates through the logical network 14K. By examining step six it can be seen that in this step no operation is performed upon the two least significant bits of the partial sum. Hence, in stage L these two bits are transmitted through logical network 14L without change. However, whereas section K transmitted three multiplier bits without change to section L, section L only transmits two multiplier bits to section M without change.

Adder circuit 205 has two sets of inputs and two sets of outputs. The first set of inputs consists of inputs 205A1 to 205A5 and the second set of inputs consists of inputs 205B1 to 205B4. The first set of outputs consists of outputs *h*1K to *h*5K and the second set of outputs consists of outputs 205S1 to 205S4. Adder 205 receives an addend via inputs 205A1 to 205A5 and an augend via inputs 205B1 to 205B5 and it generates the sum thereof on outputs 205S1 to 205S6. When no signals are being applied to the inputs of adder 205 (that is, when inputs 205A1 to 205A5 and inputs 205B1 to 205B5 are in the NULL or indeterminate condition) adder 205 transmits current through each pair of output lines *h*1K to *h*5K. A short time after a valid input signal is supplied to each of the inputs 205B1 to 205B5 and 205A1 to 205A5 the current in outputs *h*1K to *h*5K is terminated.

As will be seen in detail later outputs *h*1K to *h*5K are used to latch the outputs **211*b* to 225*b* of intersection gate network 21K and make these outputs insensitive to further changes in the inputs 211*a* to 225*b***.

Intersection gate network 20K operates as follows: When no current is flowing in line **20*a*K (note, it will be shown later that line 20*a*K is connected in series with line 18*e*K inside adder 205**) and current is flowing in lines *h*1K to *h*5K the outputs **211*b* to 225*b* of intersection gates 211 to 225 are respectively responsive to signals on inputs 211*a* to 225*a* and when no current is flowing in either line 20*a*K** or in lines *h*1K to *h*5K, the outputs **211*b* to 225*b* are insensitive to any changes in inputs 211*a* to 225*a***. Hence, when no current is flowing in *h*1K to *h*5K intersection gate network 20K performs a latching operation.

After a batch of data is gated from section J through the intersection gate network 20K to the logical network 14K, lines **18*h*1 to 18*h*5 are deactivated and the outputs of intersection gate network 20K remain latched until the outputs from logical network 14K have been gated to section L. Thereafter control circuit 18K activates the output line 18*e*A (which in turn activates line 20*a*K). When line 20*a*K is activated the outputs 211*b* to 225*b* of logical network 20K are switched to the NULL state. This NULL condition then begins to propagate from the outputs of intersection gate network 20K through the various circuits in logical network 14K**.

Adder circuit 205 could merely have one *h* output and this *h* output could be used to control the latching operations of each of the intersection gate networks 211 to 225. However, this would result in a less reliable system. Herein adder 205 is provided with five *h* outputs. The intersection gates which each of the outputs *h*1K to *h*5K control is tabulated below:

| Outputs | Intersection Gates Controlled |
|---|---|
| h1K | 211, 217 and 222. |
| h2K | 212, 218 and 223. |
| h3K | 213, 219 and 224. |
| h4K | 214, 220 and 216. |
| h5K | 215, 221 and 225. |

Before any further description of the interconnections between the various circuits is given, the function which each circuit performs and the details thereof will be given. Thereafter, a summary type of description of the operation of the entire system will be given.

*Details of intersection gates*

The details of intersection gate 211 are shown in FIGURE 4. Each of the other intersection gates in the system is identical to intersection gate 211 and hence only the details of intersection gate 211 will be described.

Intersection gate 211 has a two line input **211*a*, a three line output 211*b*, a control line 460 connected between a control line input 211*e* and a control line output 211*f*, and a latching line 461 connected between a latching line input 211*c* and a latching line output 211*d***.

Each intersection gate performs three functions. FIRST, each intersection gate performs the function which a conventional gate performs, that is, when there is no current in control line 460 it gates or transmits signals received on input **211*a* to output 211*b* and when there is current in control line 460 an intersection gate prevents signals which are applied to its input 211*a* from reaching its output 211*b*. SECOND, each intersection gate acts as a latch circuit, that is, after a signal is gated from the input 211*a* to the output 211*b*, if current is removed from latching line 461 the output 211*b* becomes insensitive to further changes in input 211*a*. THIRD, each intersection gate sets its output 211*b* to the NULL state when control line 460 is activated irrespective of the state of input 211*a***.

Intersection gate 211 includes four cryotrons 420, 430, 440 and 450 which respectively have gating elements 421, 431, 441 and 451. Cryotrons 420 and 430 each have two control lines respectively 422 and 423; and 432 and 433. Cryotrons 440 and 450 each have three control lines respectively 442, 443 and 444; and 452, 453 and 454. Each of the cryotron gates 421, 431, 441 and 451 is made resistive by a net total of two units of current in the associated control lines flowing in a direction in opposition to the current in the gate itself.

Control line 422 is connected to a fixed bias which supplies two units of current, control line 432 is connected to a fixed bias which supplies one unit of current, control line 443 is connected to a fixed bias which supplies one unit of current and control line 453 is connected to a fixed bias which supplies one unit of current. Lines 423 and 433 are connected in series between input **211*e*** and output 211*f* (the series connection is designated control line 460) and control lines 444 and 454 are connected in series between inputs 211*c* and 211*d*. (The series connection is designated latching line 461.)

Control line 442 is connected in series with the ONE line in input 211*a* and control line 452 is connected in series with ZERO line in input 211*a*. Cryotron gates 421 and 431 are connected in parallel to a constant current source 471 which supplies one unit of current. Cryotron gates 441 and 451 are connected in parallel to the output of cryotron gate 431. The output of cryotron gate 421 is connected to the NULL line in output 211*b*, the output of gate 441 is connected to the ONE line in output 211*b* and the output of gate 451 is connected to the ZERO line in output 211*b*.

Gate 421 is resistive and gate 431 is superconducting when no current is flowing in control line 460 and gate 421 is superconducting and gate 431 is resistive when current is flowing in control line 460. Gates 441 and 451 are superconducting whenever no current is flowing in latching line 461. If current is flowing in latching line 461 gate 441 is resistive except when there is current flowing in the ONE line of input 211*a*, and gate 441 is resistive except when there is current flowing in the ZERO line of 211*a*.

Intersection gate 211 operates as follows: Whenever there is current in control line 460, gate 431 is resistive and gate 421 is superconducting so that the current source 471 flows through gate 421 to the NULL line of output 211*b*. Whenever there is no current flowing in control line 460 gate 431 is superconducting and gate 421 is resistive so that the current from current source 471 flows through gate 431 to the parallel combination of gates 441 and 451. Whenever no current is flowing in latching line 461, gates 441 and 451 are superconducting. When current is flowing in latching line 461, and current is flowing in either the ZERO line or the ONE line of input 211*a*, one of the gates 441 or 451 is superconducting and the other is resistive.

The inputs to circuit 211 are activated in the following sequence with the following results: Current is first supplied to control line 460 thereby activating the NULL line of output 211*b*. After the NULL line in output 211*b* is activated and before the current in control line 460 is terminated latching line 461 is activated. Either the ONE or the ZERO line in input 211*a* is activated and thereafter the current in control line 460 is terminated. Current then shifts from the NULL line in output 211*b* to either the ONE or the ZERO line in output 211*b* depending upon whether current is flowing in the ONE or the ZERO line of input 211*a*. Next, the current in latching line 461 is terminated. Once the current in latching line 461 has been terminated the current persists in the particular line in output 211*b* where current was previously established. Stated differently, once the current in latching line 461 is terminated the output 211*b* of the circuit becomes insensitive to further changes in the input 211*a*.

This resistance to change in the input is due to the well-known persistent current phenomena. Once the current which comes through cryotron 431 is shifted into the path which includes cryotron gate 441 or into the path which includes cryotron gate 451, and thereafter both of the cryotron gates 441 and 451 are held superconducting the current will persist in the particular path wherein it was previously established. Hence, the state of output 211*b* becomes insensitive to further changes in the state of input 211*a*.

*Details of AND circuits*

The details of AND circuit 311 are shown in FIGURE 7. Each of the other AND circuits in the system is identical to AND circuit 311. The function which each AND circuit performs is identical to the function performed by a conventional AND circuit; however, a novel structure was required for the AND circuits in the present system so that the AND circuits could handle NULL or indeterminate conditions.

Each AND circuit has two inputs and an output each of which has three states, binary ONE, binary ZERO and NULL. Due to the manner in which the system operates new signals are applied to the inputs of an AND circuit only when the output of the AND circuit is in the NULL state. Assuming that an AND circuit initially has current in the NULL line in its output, the application of signals to its inputs will have the results set out in the following table:

| Inputs | Outputs |
|---|---|
| (a) One of the inputs in the ONE state and one of the inputs in the ZERO state. | Output in the ZERO state. |
| (b) Both of the inputs in the ZERO state. | Output in the ZERO state. |
| (c) Both of the inputs in the ONE state. | Output in the ONE state. |
| (d) Either one of the inputs in the NULL condition. | Output in the NULL condition. |

Due to the well-known phenomena of persistence, if the output is not in the NULL state when the new signals are applied to the inputs the circuit may not arrive at these same states. However, with the present system, new signals are only applied to the input of an AND circuit when the output is in the NULL state.

AND circuit 311 has two sets of inputs 311*a* and 311*b* and three sets of outputs 311*c*, 311*d* and 311*e*. Each set of input lines and each set of output lines has a NULL line, a ONE line and a ZERO line. The lines in output 311*e* are merely a continuation of the lines from input 311*a*, hence, output 311*e* is always in the same state as input 311*a*. Likewise the lines in output 311*d* are merely a continuation of the lines from input 311*b*, hence, output 311*b* is always in the same state as input 311*b*.

The reasons that outputs 311*e* and 311*d* are needed is shown in FIGURES 7A and 7B. FIGURE 7A shows how the two logical functions A AND B and A AND C are generated using two conventional voltage sensitive logical blocks 741 and 742. Input A merely has a branch point 745 and a line goes from this branch point to one input of each of the AND circuits 741 and 742. The crytron switching devices used in the embodiment of the invention shown herein are current sensitive rather than voltage sensitive, hence, branch points such as 745 are not permissible. In order to generate the logical functions A AND B and A AND C with the logical blocks of the present invention a circuit configuration comprising the two logical blocks 743 and 744 as shown in FIGURE 7B is required. The A input is connected to the 743*a* input of AND circuit 743 and the 743*e* output of AND circuit 743 is connected to the 744*a* input of AND circuit 744. If one desires to have the A input serve as an input to other logical blocks these must similarly be connected to the 744*e* output of AND circuit 744. If the B input is to be used to drive more logical blocks these must be similarly connected to the 743*d* output of AND circuit 743.

AND circuit 311 includes three cryotrons 710, 720 and 730, each of which has a gating element respectively 714, 724 and 734, and three control lines respectively 711, 712 and 713; 721, 722 and 723; and 731, 732 and 733.

Each of the gating elements 714, 724 and 734 is made resistive by a net total of two units of current in the associated control lines in a direction in opposition to the direction of the current in the gating element itself. The manner in which each of the control lines is connected is tabulated below:

| Control Line | Connected To— |
|---|---|
| 711 | NULL line in input 311a. |
| 712 | A fixed bias supplying two units of current. |
| 713 | NULL line in input 311b. |
| 721 | ONE line in input 311a. |
| 722 | Fixed bias supplying three units of current. |
| 723 | ONE line in input 311b. |
| 731 | ZERO line in input 311a. |
| 732 | Fixed bias supplying two units of current. |
| 733 | ZERO line in input 311b. |

Each of the gating elements 714, 724 and 734 are connected in parallel to a source of current 750 which supplies a current of one unit magnitude. The three lines in output 311*c* are respectively connected to the other end of gating elements 714, 724 and 734.

The result of the above connections is that when both the NULL line in input 311*a* and the NULL line in input 311*b* have current therein, gating elements 724 and 734 are resistive and gating element 714 is superconducting thereby forcing the current from current source 750 to flow in the NULL line of output 311*c*. When a section is nullified this is the condition which always occurs and since each section is always nullified before new signals are applied to the inputs thereof, an AND circuit always has current flowing in the NULL line of the output before new ONE or ZERO signals are applied to the inputs 311*a* or 311*b*.

When either the NULL line in input 311*a* or the NULL line in 311*b* have current therein gating element 714 is superconducting, hence, so long as one of the inputs 311*a* or 311*b* remains in the NULL state, current will continue to flow in the NULL line of the output due to persistence.

Assuming that current is initially flowing in the NULL line of the outputs when both the ONE line in input 311*a* and the ONE line in input 311*b* has current therein gating element 714 and 734 are resistive and gating element 724 is superconducting thereby causing the current from current source 750 to flow in the ONE line of output 311*c* and whenever one input 311*a* or 311*b* has current in the ZERO line thereof and the other input has current in the ZERO line thereof gating elements 714 and 724 are resistive and gating element 734 is superconducting thereby causing the current from current source 750 to flow in the ZERO line of output 311*c*. The result is that output 311*c* represents the AND function of inputs 311*a* and 311*b*.

*Details of driver circuits*

The details of driver circuit 209 are shown in FIGURE 6B. Driver circuit 210 is identical to driver circuit 209 and hence no details of driver 210 will be given herein.

Driver circuit 209 has a three line input 209*a*, a three line output 309*b* and a three line output 209*c*. Each input and each output has a NULL line, a ONE line and a ZERO line. The circuit operates so that whenever there is current in the NULL line of input 209*a* there is current in the NULL line of outputs 209*b* and 209*c*, whenever there is current in the ONE line of input 209*a* there is current in the ONE line of outputs 209*b* and 209*c* and whenever there is current in the ZERO line of input 209*a* there is current in the ZERO line of outputs 209*b* and 209*c*.

The function which driver 209 performs is similar to the function which a cathode follower performs in vacuum tube circuitry. Instead of having one input drive a large number of logical blocks it is better and faster if the one input drives a number of driver circuits and these driver circuits in turn each drive a smaller number of logical blocks. Stated differently, it can be said that the speed of the circuitry is increased if the fan-out is limited. For detailed discussion of how this increases the speed of circuitry, see application Serial No. 132,895 entitled "Memory System" by Nathaniel Rochester, filed Aug. 31, 1961 and assigned to the assignee of the present invention.

Driver 209 has three cryotrons 670, 680 and 690 which respectively have gating elements 671, 681 and 691 and control lines 672 and 673; 682 and 683; and 692 and 693. Each of the control lines 673, 683 and 693 is connected to a bias supply which supplies two units of bias current. Control lines 672, 682 and 692 are connected in series between the lines in input 209*a* and the lines in output 209*c*. Each of the gating elements 671, 681 and 691 are made resistive by a net total of two units of current in the associated control line in a direction in opposition to the cuernt in the gating element itself. Each of the gating elements 671, 681 and 691 is connected in parallel to a current source 695 which supplies a current of one unit magnitude, and the second end of each of the gating elements 671, 681 and 691 is connected to one of the lines in output 209*b*.

Each of the gating elements is resistive except when there is current in the associated control line 672, 682 or 692. Hence, depending upon which line in input 209*a* has current therein one of the cryotrons is superconducting and the other two are resistive. The current from current source 695 is thereby directed to the appropriate lines in output 209*b*. Hence, under steady state conditions the state of output 209*b* (and of output 209*c*) is always the same as the state of input 209*a*.

*Details of OR circuits*

The details of OR circuit 341 are shown in FIGURE 6A. Eoch of the other OR circuits in the system is identical to OR circuit 341. The function which each OR circuit performs is identical to the function performed by a conventional OR circuit; however, in the present system a novel structure was required to provide an OR circuit which could handle NULL states.

| State of Inputs | State of Outputs |
|---|---|
| One of the inputs in the ONE state and one of the inputs in the ZERO state. | Output in the ONE state. |
| Both of the inputs in the ONE state | Output in the ONE state. |
| Both of the inputs in the ZERO state | Output in the ZERO state. |
| Either one of the inputs in the NULL state. | Output in the NULL state. |

OR circuit 341 has two three line inputs 341*a* and 341*b*, and a three line output 341*c*.

OR circuit 341 has two inputs and an output each of which has three states, binary ONE, binary ZERO and NULL. As was previously explained with reference to AND circuits, due to the manner in which the system operates, new signals are applied to the inputs of a logical block only when the output of the logical block is in the NULL state. Assuming that an OR circuit initially has current in the NULL line in its output the application of signals to its inputs will have the results set out in the following:

(1) If there is current in either the ONE line of input 341*a* or in the ONE line of input 341*b* and there is current in the ZERO line of the other input, the ONE line in output 341*c* is activated.

(2) If there is current in both the ZERO line of input 341*a* and in the ZERO line of 341*b* there is current in the ZERO line of output 341*c*.

(3) If there is current in the NULL line of either input 341*a* or in the NULL line of input 341*b* there is current in the NULL line of output 341*c*.

OR circuit 341 has three cryotrons 620, 630 and 640. Cryotrons 620, 630 and 640 respectively have gates 621, 631 and 641 and each of the cryotrons has three control lines respectively 622, 623 and 624; 632, 633 and 634; and 642, 643 and 644. Control lines 623 and 633 are connected to a fixed bias which supplies a current of two units magnitude and control line 643 is connected to a bias which supplies a current of three units magnitude.

Each of the cryotron gates 621, 631 and 641 is made resistive by a net total of two units of current in the associated control lines in a direction opposed to the direction of the current in the associated gate.

The three lines in input 341*a* are respectively connected to one end of the control lines 622, 632 and 642 and the three lines in input 341*b* are respectively connected to one end of control lines 624, 634 and 644. The second end of control lines 624, 634 and 644 are connected to line 660. Each of the gating elements 621, 631 and 641 are connected in parallel to the line 660. The output of each of the gates 621, 631 and 641 are respectively connected to the three lines in output 341*c*.

The circuit operates as follows: When there is current in the NULL line in either input 341*a* or in input 341*b*, gating elements 631 and 641 are resistive and gating element 621 is superconducting. Hence, current flows in the NULL line in output 341*c*. When there is current in the ONE line in one of the inputs 341*a* or 341*b* and there is current in the ZERO line of the other input 341*a* or 341*b*, the gating elements 621 and 641 are resistive and current flows in the ONE line in output 341*c*. When there is current in the ZERO line in both of the inputs 341*a* and 341*b* cryotron gating elements 621 and 631 are resistive and current flows in the ZERO line in output 341*c*.

*Details of NULL injector gate*

The details of the circuitry in NULL injector gate 361 are shown in FIGURE 5. The circuitry in each of the other NULL injector gates 362 to 369 is identical to the circuitry in NULL injector gate 361.

Each of the NULL injector gates 361 to 369 is connected between the output of a first logical block (an AND circuit or an OR circuit) and the input of a second logical block. The NULL injector gates perform two functions. First, while a section is processing a batch of data, each NULL injector gate in the section transfers the signals from the output of the first logical block to the input of the second logical block unchanged. Second, after a section completes processing a batch of data and the data has been transferred to the next section, all of the NULL injector gates in the section (upon receipt of a signal from the associated control circuit 18) set their output to the NULL state irrespective of the state of their input. Hence, they transmit a NULL signal to the second logical block irrespective of the signal appearing on the output of the first logical block.

The NULL injector gate 361 has a three line input 361*a*, a three line output 361*b* and a control line 550 connected between a control line input 361 and control line output 361*d*. There is always current in one and only one of the lines in input 361*a* and likewise there is always current in one and only one of the lines in output 361*b*. When current is flowing in control line 550 there is current in the NULL line in output 361*b* irrespective of which of the lines input 361*a* has current therein. If there is no current flowing in control line 550 there is current in the particular line in output 361*b* which corresponds to the line in input 361*a* which has current therein at the particular time.

The circuit includes three multicontrol cryotrons 510, 520 and 530. Each of the cryotrons 510, 520 and 530 has a gate, respectively 511, 521 and 531 and three control lines respectively 512, 513 and 514; 522, 523 and 524; and 532, 533 and 534.

Each of the cryotron gates 511, 521 and 531 is made resistive by a net total of two units of current flowing in the associated control lines in a direction opposed to the direction of the current in the associated gate. Each of the control lines 513, 523 and 533 is connected to a source of constant bias current of two units magnitude. Control lines 512, 522 and 532 are connected in series with control line 550 and control lines 514, 524 and 534 are respectively connected in series with the NULL, ONE and ZERO lines in input 361*a*.

The circuit operates as follows: cryotron gate 511 is resistive unless there is current in either line 512 or 514, cryotron gate 521 is resistive unless there is no current in line 522 and current in line 524 and cryotron gate 531 is resistive unless there is no current in line 532 and there is current in line 534.

The result is that if control line 550 has current therein, cryotron gates 521 and 531 are resistive and cryotron gate 511 is superconducting irrespective of which of the lines in input 361*a* has current therein. If control line 361*c* is not activated only cryotron gates 521 and 531 are resistive if there is current in the NULL line of input 361*a*, only cryotron gates 511 and 531 are resistive if there is current in the ONE line in input 361*a* and only cryotron gates 511 and 521 are resistive if there is current in the ZERO line in input 361*a*.

Each of the three lines in input 361*a* are connected together and connected to line 540. Hence, since there is always current in one and only one of the lines in input 361*a* there is always one unit of current in line 540. The gates 511, 521 and 531 are connected in parallel with line 540 and the three lines in the output 361*b* are respectively connected to the three gates 511, 521 and 531.

In conclusion circuit 361 operates as follows: When there is current in control line 550 there is always current in the NULL line in output 361*b*. When control line 550 is not activated there is current in the particular line in output 361*b* which corresponds to the particular line in input 361*a* which has current therein at the particular time.

*Detailed description of adder circuit*

The adder circuit 205 which is shown in block form in FIGURE 2*b* is shown in detail in FIGURES 3*a* and 3*b* (which fit together as shown in FIGURE 3). The logical structure of the adder circuitry shown in FIGURES 3*a* and 3*b* is conventional. However, the logic has been constructed out of the previously described AND and OR logical blocks and a number of the previously described NULL injector gates has been included in the circuitry in order to decrease the time required to change the circuitry to the NULL condition.

The circuitry receives as inputs a five digit augend and a five digit addend. The digits of the augend are designated 205A1 to 205A5 and the digits of the addend are designated 205B1 to 205B5. The circuitry sums the augend and the addend to produce a six digit sum. The digits of the sum are designated 205S1 to 205S6.

The adder circuit 205 consists of twenty-seven AND circuits 311 to 337, fourteen OR circuits 341 to 353 and nine NULL injector gates 361 to 369. Line 18*e*K is connected in series with the control line of each of the NULL injector gates 361 to 369. As previously described the NULL injector gates 361 to 369 have no effect upon the logic, that is, the signals which appear on the output of each NULL injector gate is identical to the signal which appears on the input of the particular NULL injector gate (except when line 18*e*K is active). Hence, the logic of the circuitry will first be explained under the assumption that line 18*e*K is inactive and that the NULL injector gates 361 to 369 have no effect upon the logics. Later the function which the NULL injector gates 361 to 369 perform will be explained.

Another point which must be noted is that the NULL line on the output of each of the NULL injector gates 361, 362, 364, 365 and 367 does not go directly to the next logical block. Instead it goes to one of the outputs which are respectively designated *h*1K to *h*5K. Each of the outputs *h*1K to *h*5K has two lines and the function of these outputs will be explained later. However, for the present purposes it can be assumed that the two lines in each of the outputs $h1$K to $h5$K are connected in series. Later it will be seen why this is a reasonable assumption.

In order to generate the necessary logical functions, it is necessary to generate the inverse of some of the inputs. That is, it is necessary to obtain signals such as NOT 205B1. With the three line logic used herein it is very easy to obtain the inverse of a particular input. By merely interchanging the ONE and ZERO lines of a particular input the inverse of the input is obtained. For example, as previously described, output **312*d* of AND circuit 312 is identical to input 312*b*. Hence, output 312*d* is the same as the input 205B1. Prior to its entry into AND circuit 311 the lines in output 312*d* are interchanged at point 385. Hence, AND circuit 311 generates the function 205A1 AND NOT 205B1. (Note, for ease in illustration the numeral 205** is not used where a logical function is indicated on the drawings, hence, the above logical function is indicated as A1 AND NOT B1.

Logically the adder 205 is connected as follows: AND circuits 311 and 312 and OR circuit 341 generate the function 205A1 EXCLUSIVE OR 205B1, which is the sum digit 205S1. The AND circuit 313 generates the carry between the first and second orders (herein designated C12). AND circuits 314 and 315 and OR circuit 342 generates the function 205A2 EXCLUSIVE OR 205B2 and AND circuits 326 and 327 and OR circuit 346 use the carry from the first order and the output of OR circuit 342 as inputs and they generate the function 205A2 EXCLUSIVE OR 205B2 EXCLUSIVE OR C12 which is the second order sum digit 205S2. The other sum digits 205S3 to 205S6 are generated in a similar manner.

AND circuits 316, 319, 322 and 325 each generate what is known in the art as a fast carry. AND circuit 316 for example, generates the function 205A2 AND 205B2. When this function is a ONE it in effect says that there must be a carry from the second to the third order digit. The output of AND circuit 316 through OR circuit 347 passes this carry to the next position. AND circuits 319, 322 and 325 in conjunction wtih OR circuits 349, 351 and 353 perform a similar function for the other digital positions.

After the circuit 205 receives a set of inputs and it has generated a sum therefrom, all of the logical blocks therein are set to the NULL condition by the activation of line **18*e*K in the following manner: (a) each of the inputs 205A1 to 205A5 and 205B1 to 205B5 is placed in the NULL state by the intersection gate network 20K. This NULL signal propagates through AND circuits 311 to 325 to OR circuits 341 to 345 and it sets these AND and OR circuits to the NULL condition. (b) Since control line 18*e*K is in series with the control line for each of the NULL injector gates 361 to 369 each of the NULL injector gates 361 to 369 is set to the NULL condition when line 18*e*K is activated and the NULL line in the output of each of the NULL injector gates 361 to 369 is activated. The NULLS injected in the circuits by NULL injector gates 361 to 369 propagates through the logical blocks connected in the circuitry after these NULL injectors. It can therefore be seen that the circuitry is not set to the NULL condition by merely applying NULL signals to the inputs 205A1 to 205A5 and 205B1 to 205B5 and allowing these NULL signals to propagate through all of the logical blocks. Instead the NULLS are applied at three points in the circuitry, (a) NULL signals are applied at inputs 205A1 to 205A5 and 205B1 to 205B5, (b) NULL signals are applied after the first two stages of logic in the adder by NULL injector gates 361 to 368 and (c) a NULL signal is applied after the sixth stage of logic in the adder by NULL injector 369. A NULL signal therefore never needs to propagate through more than four blocks of logic. The result is that the entire circuitry is set to the NULL condition in the time required for a NULL signal to propagate through four stages of logic. If NULL signals were merely applied to the inputs 205A1 to 205A5** and

205B1 to 205B5 and allowed to propagate through the entire ten stages of logic (eight stages in the adder and two due to AND circuits 230 to 235 and drivers 209 and 210) which is two and a half times as much time as would be needed to set all of the logic blocks and the outputs 205S1 to 205S6 to the NULL condition.

The outputs $h1$K to $h5$K are latching lines which are used to generate a signal which tells the intersection gate network 20K (see FIGURE 1 and FIGURES 2*a*, 2*b* and 2*c*) that section K has received a new batch of data and that the signals on the output of intersection gate network K should be stabilized and not changed until section K has produced a new batch of data at its outputs and until this new batch of data is gated to the next section of circuitry.

Since each of the output lines $h1$K to $h5$K is connected in series with the NULL output line of the respective NULL injector gates 361, 363, 365, 366 and 368, there will be current in output lines $h1$K to $h5$K until signals which are applied at inputs 205A1 to 205A5 and 205B1 to 205B5 go through the associated logical blocks 311 to 325, 341 to 345 and the associated NULL injector gates 361 to 368 thereby setting the outputs of NULL injector gates 361 to 368 to either the ONE or the ZERO conditions and terminating the flow of current in the NULL lines in the output of the NULL injector gates 361 to 368 thereby terminating the current flow in the associated outputs $h1$K to $h5$K.

*Details of detectors*

The details of the circuitry in detector 16K is shown in FIGURE 8. The circuit includes a logical thirteen way conventional AND circuit 805, a logical thirteen way conventional OR circuit 806 and a NOT circuit (an inverter) 807.

The function of detector 16K is to detect the following two conditions; (a) When all of the outputs of section K are in the NULL state and (b) when all of the outputs of section K have valid signals thereon, that is, when none of the outputs of section K are in the NULL state. In order to do this the NULL line of each output of section K is interrogated.

When each of these NULL lines has current therein AND circuit 805 activates output line **16*n*K to give a NULL indication and when there is no current in any one of the NULL lines OR circuit 806 and NOT circuit 807 activates output 16*v*K** to give a VALID indication.

It should be understood that block 805 and block 806 are logical representations. In order to build a high speed thirteen way AND circuit or a high speed thirteen way OR circuit, a plurality of cascaded stages are required as is well known in the art. Conventional multi-input cryotron AND and conventional cryotron multi-input OR circuits are well known in the art and no further description thereof will be given herein. It should be emphasized that AND circuit 805 and OR circuit 806 are conventional AND and OR circuits and not the three state AND and OR circuits described herein.

A simplification of the complexity of the detectors can be achieved by noting that there are fewer stages of logic between certain of the outputs and a point where NULL signals are injected into the circuitry. For example, those outputs associated with the multiplier bits are directly connected to the intersection gates. Hence, these outputs will always be NULL or VALID when all of the other outputs are in the same condition and they need not be interrogated by the detector circuit. This would lead to a simpler detection circuit; however, the design shown herein merely has a more complex detector for the sake of uniformity and added reliability.

*Details of input 11 and output 12*

Input 11 supplies a five digit multiplicand, a five digit multiplier and a five digit partial sum to the intersection gate network 20J. Under most conditions and for performing conventional type multiplication the partial sum digits supplied by input 11 to the intersection gates 20J consist of all ZEROES.

After a batch of data (i.e., a multiplicand, a multiplier and a partial sum) is gated through intersection gate network 20J, the outputs of input 11 are not activated to indicate a new batch of data until line 18*f*J is activated. After line 18*f*J is activated all of the outputs of the input 11 are set to the NULL condition and line 18*b*J is activated. Thereafter when input 11 has a new batch of data available it activates its outputs in accordance with this data thereby changing its outputs from the NULL to the VALID state. Line 18*a*J is therefore activated by detector 16. Thereafter when section J is ready to receive another batch of data, the data is gated through intersection gate network 20J, line 18*f*J is activated and the above cycle repeats.

No details are herein shown of the specific circuitry in input 11 since such circuitry is conventional in design and for the simplest case might merely consist of a plurality of switches.

The products generated by the circuit shown herein are received at output circuit 12. Output circuit 12 accepts the sums generated by logical network 14N and each time it accepts a new sum it activates line 18*d*N. In the normal type of system the output 12 will not be able to receive products at an unlimited rate; however, each time it receives a new product it will activate lines 18*d*N. If a substantial time period goes by during which output 12 does not accept a product and if during this time period input 11 continues to supply new inputs the pipeline consisting of sections J to N will be filled and line 18*f*J will not be activated any more and hence input 11 will not supply any more new inputs. As soon as output 12 accepts a set of output signals line 18*d*N will be activated and this signal will progress back through the various stages N to J and input 11 will not be allowed to supply a new set of inputs.

Each time line 18*d*N is activated to indicate that the output 12 has accepted a new batch of data it is held active until control circuit 18N activates line 18*e*N. Hence line 18*d*N is activated by output circuit 12 each time it receives a new batch of data and the line is held active until the control circuit 18N begins to set the circuitry in section N to the NULL state.

No details of output 12 are given herein since it is assumed that output 12 may be some type of communication channel, computer register or computer input-output device. In its simplest state output 12 could consist of a plurality of indication lights and manually operated switches.

*Details of control circuit*

The detail of the logical structure of control circuit 18K is shown in FIGURE 9A. The manner in which the control circuit can be embodied in cryogenic circuitry is shown in FIGURE 9B. First, the logical structure and the operation of the control circuit will be explained with reference to FIGURE 9A and later the actual circuitry will be explained with reference to FIGURE 9B.

As shown in FIGURE 9A control circuit 18K includes two bistable triggers 910 and 920, AND circuits 912, 913 and 914, and two NOT circuits (inverters) 915 and 916. Each of the triggers 910 and 920 has two bistable states respectively designated the "off" state and the "on" state. Each trigger has two inputs designated "set off" and "set on." Pulses on these inputs set the triggers to the respective states.

Trigger 910 has one output 910 which is active when the associated trigger is in the ON condition. Trigger 920 has two outputs 920*c* and 920*d*. Output 920*c* is active when the trigger is in the ON condition and output 920*d* is active when the trigger is in the OFF condition.

Circuit 18K has four inputs 18*a*K, 18*b*K, 18*c*K and 18*d*K and two outputs 18*f*K and 18*e*K. Input 18*a*K is active when all of the outputs of section J are in a valid state, input 18*b*K is active when the circuitry in section J is being nullified by control circuit 18J, input 18*c*K is active when all of the outputs of section K are in the NULL state, and input 18*d*K is active after a batch of data has been transferred from section K to section L. Input 18*d*K remains active until control circuit 18L begins to nullify the circuitry in section L. Output 18*e*K sets the circuitry in intersection network 20K and the circuitry in logical network 14K in section K to the NULL condition and it activates input 18*b*L of control circuit 18L. Note, when line 18*e* is inactive a batch of data can pass from section J to section L. Output 18*f*K is used to indicate to section J when a batch of data has been transferred from section J to section K.

The functions which control circuit 18K perform are tabulated below:

(1) After a batch of data is transferred from section K to section L input 18*d*K is activated by the control circuit 18L in section L. Control circuit 18K then activates output 18*e*K which sets the circuitry in intersection gate network 20K and the circuitry in logical network 14K to the NULL condition.

(2) If after the circuitry in logical network 14K is set to the NULL condition input 18*a*K is activated indicating that a batch of data is ready for transfer between section J and section K the signal on output 18*e*K is terminated allowing the batch of data to be transferred from section J to section K. (Under certain special conditions explained later, this does not occur.)

*Operation of control circuit 18K.*—The following discussion of the operation of the control circuitry takes as a starting point the situation when the circuitry in each of the sections J to N is in the NULL condition and the system is merely awaiting a new batch of data from input 11. Under these conditions both of the triggers in control circuit 18K are in the OFF condition, output 18*e*K is active, the logical circuitry in both sections J and K is in the NULL condition, inputs 18*b*K and 18*c*K are active and input 18*a*K is inactive. For reasons which will be seen later when all the sections are in the NULL state input 18*d*K is inactive and output 18*f*K is inactive.

When a batch of data is gated from input 11 to section J, line 18*b*K is deactivated (in a manner which will be explained later), thereby switching trigger 910 to the ON state and activated line 910*c*. Thereafter after section J processes the batch of data which was gated to its input, a valid batch of data will appear at the outputs of section J. When the valid batch of data appears at the outputs of section J line 18*a*K is activated. Since the circuitry in section K is in the NULL state line 18*c*K is activated and all three of the inputs of AND circuit 913 are activated. Trigger 920 is therefore switched to the ON state thereby activating line 920*c*, and deactivating line 920*d*. The deactivation of line 920*d* allows the information appearing at the outputs of section J to be gated through intersection gate network 20K to logical network 14K. The activation of line 18*f*K tells the control circuit 18J that it can activate its output line 18*e*J to nullify the circuitry in section J.

After section K completes processing the batch of data which was supplied to its inputs, line 18*c*K will be inactive thereby activating one input of AND circuit 914 through NOT circuit 915. Thereafter when the batch of data which appears at the output of section K is transferred through intersection gate network 20L into section L, line 18*d*K is activated by the control circuit 18L. At this time, both inputs of AND circuit 914 are active thereby switching trigger 920 to the OFF state and activating line 920*d*. The activation of line 920*d* activates output 18*e*K thereby initiating the nullification of the circuitry in section K.

In the above description, the function of trigger 910 was not explained. The trigger 910 prevents the same batch of data from being gated from the output of section J to the input of section K twice. When a batch of data is gated from section J to section K, output 18*f*K is activated and a short time thereafter control circuit 18J activates line 18*b*K. If, when this occurs, all of the outputs of section K are not still in the NULL state, line 18*c*K will not be activated and NOT circuit 915 will activate the second input of AND circuit 912 thereby switching trigger 910 to the OFF state. This will deactivate line 910*c* thereby deconditioning one input of AND circuit 913 and prohibiting the deactivation of line 920*d* until line 18*b*K is deactivated. That is, it will prohibit any data which appears at the output of section J from being gated into section K (because line 920*d* is held active) until section J is completely in the NULL state (as indicated by the deactivation of a signal on line 18*b*K).

A cryotronic embodiment of control circuit 18K is shown in FIGURE 9B. The circuit includes four cryotrons 941, 942, 943 and 944. The four cryotrons are connected in two loop circuits. The first loop circuit has two current paths 945 and 946 connected between a current source 947 and a current collecting means 948. The second loop circuit has two current paths 949 and 950 connected between a current source 951 and a current connecting means 952. The respective gating elements of cryotrons 941 and 942 are respectively connected in series with current paths 945 and 946. The gating elements for cryotrons 943 and 944 are respectively connected in series with current paths 949 and 950. One control line for each cryotron is connected to a bias supply and the other control lines of the cryotrons are connected to the inputs as shown.

Cryotron 941 performs the function of AND circuit 912 and of NOT circuit 915, cryotron 942 performs the function of NOT circuit 916, cryotron 943 performs the function of AND circuit 913 and cryotron 944 performs the function of AND circuit 914. The first loop circuit which includes current paths 945 and 946 performs the function of trigger 910 and the second loop circuit which includes current paths 949 and 950 performs the function of trigger 920. Each loop circuit has two stable states, current in the first current path and current in the second current path indicating the two stable states.

Each input 18*a*K, 18*b*K, 18*c*K and 18*d*K and each output 18*e*K and 18*f*K has two lines which are connected in series within the circuit 18K. An input or an output is active when there is current flowing in the two lines of the input or of the output. The two lines in output 18*e*K are connected to the circuitry in intersection gate network 20K, logical network 14K and control circuit 18L by connecting the two lines in output 18*e*K in series with each of the control lines in the above circuitry which output 18*e*K controls.

The cryogenic circuit of FIGURE 9B operates exactly as does the previously described logical circuit of FIGURE 9A. However, it must be understood that when a cryotron is made resistive current is switched to the opposite side of the associated loop circuit. For example, when input 18*b*K is active and input 18*c*K is inactive (thereby activating the output of AND circuit 912 in FIGURE 9A) cryotron 941 is made resistive thereby switching current from path 945 to path 946 and deactivating one of the inputs of cryotron 943. This corresponds to activating one of the inputs of AND circuit 913 when the output of AND circuit 912 is activated thereby changing the state of trigger 910.

The gating element of each cryotron 941, 942, 943 and 944 is made resistive by two units of current flowing in the associated control lines in a direction opposed to the direction of the current in the particular gating element. Cryotrons 941, 943 and 944 each have three control lines and cryotron 942 has two control lines. Control line 941*a* of cryotron 941 has one unit of bias current flowing therein in a direction opposed to the direction of the current in the gating element of cryotron 941. Control line 942*a* of cryotron 942 has two units of current flowing therein in a direction opposed to the direction of the current in the gating element of cryotron 942, control line 944*a* of cryotron 944 has one unit of current flowing therein in a direction opposed to the direction of the current in gating element of cryotron 944 and control line 943*a* of cryotron 943 has one unit of current flowing therein in the same direction as the current in the gating element of cryotron 943. Each of the current sources 947 and 951 supplies one unit of current to the associated loop circuits.

*General summary of system operation*

The system of the present invention includes a plurality of interconnected sections. Each section has (a) a plurality of inputs 20*d* for receiving a batch of data from a previous section, (b) a plurality of outputs 14*a* for supplying a batch of data to a following section, (c) a logical network 14 having means for performing a logical operation upon a batch of data and for activating the output 14*a* in accordance with the thus modified batch of data and (*d*) and an intersection gate network 14 connected between the inputs 20*d* and the logical network 14. A batch of data from a preceding section must go through the intersection gate network 20 before it can read the logical network 14.

Each intersection gate network 20 has (a) a plurality of inputs 20*d* for receiving a batch of data from the previous section (b) a plurality of outputs 20*c* for supplying this batch of data to the logical network 14 which is in the same section (c) a control input 20*a* and (d) a plurality of latching inputs 20*h*. Each of the inputs 20*d* has two states to represent binary ONE and binary ZERO states and each output 20*c* has three states to represent binary ONE, binary ZERO and NULL states. Each intersection gate network operates as follows: When input 20*a* is active, each of the outputs 20*c* is set to the NULL state, when input 20*a* is not activated and inputs 20*h* have current therein the outputs 20*c* are responsive to the inputs 20*d* and when line 20*a* has no current therein and lines 20*h* have no current therein, outputs 20*c* are not responsive to changes in the state of inputs 20*d* and they persist in the previous state which they were in.

Each intersection gate network is operated as follows: FIRST, line 20*a* is activated to set each of the outputs thereof to the NULL condition, and current is then applied to each of the inputs 20*h*. SECOND, a batch of data is supplied to inputs 20*d* and line 20*a* is deactivated. THIRD, this batch of data is transmitted through the intersection gate network 20 to the outputs 20*c*. FOURTH, the current in lines 20*h* is terminated and the outputs 20*c* become insensitive to further changes in inputs 20*d*. This provides a stable input for the logical network 14 which is in the same section. Logical network 14 then processes the batch of data received via inputs 20*c* and a valid batch of data appears on outputs 14*a*. After the outputs are gated to the next section, the above cycle is repeated.

Each section also includes a detector 16 which interrogates the outputs of the logical network in the associated section to determine when all of the outputs are in the NULL state and when all of the outputs are in a VALID state. That is, each detector 16 indicates when all of the outputs of the associated section are in the NULL state and when none of the outputs of the associated section are in the NULL state.

Each section also includes a control circuit 18 which has two outputs 18*e* and 18*f* and which performs the following three functions: FIRST, after a batch of data is gated from the associated section into a following section, the control circuit activates output 18*e* which sets the circuitry in the associated logical network 14 and the associated intersection gate network 20 (through line 20*a*) to the NULL state. SECOND, when the associated section is ready to receive a new batch of data and when the preceding section has a valid batch of data on its outputs 14*a*, the control circuit deactivates its output 18*e* which allows a batch of data to be gated from the output 14*a* of the preceding section through the intersection gate network 20 in the associated section to the logical network 14 in the associated section. THIRD, after a batch of data is gated from the preceding section into the associated section control circuit 18 activates its output 18*f* which indicates to the control circuit in the preceding section that data has been gated therefrom into a following section and that the circuitry in the preceding section can be set to the NULL state.

When the output 18*e* of the control circuit 18 in a particular section is activated, no data can be transferred from the preceding section to the particular section since circuitry in the particular section is held in the NULL state. When a control circuit determines that a batch of data should be gated from a preceding section into the associated section it terminates the signal on its output 18*e* and this forces the batch of data from the preceding section to be gated through the intersection gate network 20 into the associated section. As previously explained, after a batch of data is gated through the intersection gate network 20 in a section, the logical network 14 in the section terminates the signals on lines 20*a* thereby latching the intersection gate network 20 and making the outputs 20*c* insensitive to further changes in the input 20*d*. The intersection gate network 20 remains latched until another signal appears on line 20*a* to set the outputs thereof to the NULL condition.

Each control circuit interrogates the outputs of the detector in the associated section and the outputs of the detector in the preceding section to determine when the associated section is ready to receive a batch of data and when the preceding section has a valid batch of data on its output. When a control circuit determines that the associated section is ready to receive a batch of data and that the preceding section has a new valid batch of data on its outputs, the control circuit deactivates its output 18*e* which forces the batch of data from the preceding section to be gated into the associated section.

A control circuit allows a batch of data to be gated from the preceding section into the associated section when the following conditions are fulfilled:

(1) All the outputs of the associated sections are in the NULL condition.

(2) The associated section is not then processing a batch of data.

(3) The outputs of the previous section are indicating a valid batch of data.

(4) The outputs of the previous section are indicating a batch of data which has not been previously gated into the associated section.

As explained above, one of the functions which each control circuit performs is that of nullifying the circuitry in the associated section after a batch of data has been transferred from the associated section to a following section. The manner in which each control circuit performs this function is as follows: Each control circuit 18 has an input 18*d* which is connected to the output 18*f* of the control circuit in the following section. When a control circuit allows a batch of data to be gated from a preceding section into the associated section, it activates its output 18*f*. This tells the control ciruit in the preceding section that a batch of data has been gated therefrom into the following section. The control circuit in the preceding section then activates its output 18*e* which nullifies the circuitry in the preceding section.

Herein a multiplication system has been shown which merely consists of a series of sections having no branch points. It should be understood that a section could have a plurality of outputs each going to the inputs of a different section. In such a system, the control circuits would have to be slightly more complicated since they would need to interrogate the outputs of the detectors in each of the possible preceding sections and the output of the control circuits in each of the possible following sections. However, the principles of operation would be similar to those shown and described herein.

*Alternate embodiment*

Alternate preferred embodiments of the invention are shown in FIGURES 10, 11 and 12. The first preferred alternate embodiment relates to a system which has for each control circuit 18, the control circuit shown in FIGURE 10, and for each intersection gate the intersection gate the intersection gate shown in FIGURE 11. The logical networks 20 and the detectors 16 for the second embodiment are almost identical to those of the first embodiment. Since the second embodiment of the invention is in many respects similar to the first embodiment of the invention only those parts of the second embodiment which differ from the first embodiment will be described.

In the second embodiment of the invention as in the first embodiment previously described, each intersection gate network 20 has a plurality of intersection gates, each of which has a control line connected in series with line 20*a*. However, in the first embodiment of the invention the NULL lines at the output of one section do not connect to the intersection gate network of the following section. In this second embodiment of the invention, each NULL line in the output of each logical network 14 connects to the same intersection gate in the following intersection gate network 20 as do the ONE and ZERO lines of the same output. Each intersection gate therefore has both a three line input and a three line output each of which has ZERO, ONE and NULL lines. Each intersection gate also has a control line and a latching line as in the first embodiment of the invention.

In the first embodiment of the invention, data is forced through an intersection gate whenever the control line for the gate is inactivated. That is, the output of an intersection gate is forced out of the NULL state when the control line for the gate is deactivated, hence, the control line cannot be deactivated until valid data is waiting to be gated through the gate. In the second embodiment of the invention, data is only gated through an intersection gate when both the control line for the gate is inactive and the associated output of the previous logical network has no current in its NULL line. Hence, in the usual case, the control line for each section can be deactivated after the section is nullified since the data from the preceding section will not be transferred until the outputs of the previous section go from the NULL to the valid condition.

With this alternate preferred embodiment of the invention when the circuitry in two successive sections is in the NULL state and a batch of data is supplied to the input of the first section, the batch of data will propagate through both sections without any action on the part of the control circuit 18 which is associated with the second section. The operations which each control circuit performs in the second embodiment of the invention can be summarized as follows: FIRST, when all of the circuitry in the associated section is not in the NULL state, it inhibits the transfer of data into the associated section. SECOND, after a batch of data has been gated from the associated section into the next section it initiates the nullification of the circuitry in the associated section.

The first condition set forth above can be stated in any of the following alternate ways: (a) The control circuit allows data to be gated into the associated section if all the outputs of the associated section are in the NULL state and the associated section is not then processing a batch of data, (b) the control circuit does not inhibit the transfer of data into the associated section if the outputs of the associated section are in the NULL state and the associated section is not then processing a batch of data or (c) if any of the circuitry in the associated section is in a valid state the control circuit inhibits the transfer of data into the associated section. The second condition stated above can be alternately stated as follows: The control circuit initiates the nullification of the circuitry in the associated section when none of the outputs of the associated section are in the NULL state and the intersection gates associated with the following section are opened.

In order to clearly show the correspondence between the first embodiment of the invention and the second embodiment of the invention, the same numerals are used to designate components in the second embodiment of the invention as were used to designate the corresponding components in the first embodiment of the invention; however, the numerals which are used to designate the components of the second embodiment of the invention are followed by a prime.

The preferred alternate control circuit shown in FIGURE 10 includes NOT circuit 915' and 916', AND circuits 912', 913' and 914' and triggers 910' and 920'. The circuit has four inputs designated 18*b*K', 18*c*K', 18*d*K' and 18*z*K' and two outputs designated 18*f*K' and 18*e*K'. Inputs 18*b*K', 18*c*K' and 18*d*K' are similar to the corresponding inputs of the previously described control circuit and the two outputs 18*f*K' and 18*e*K' are similar to the corresponding outputs in the previously described control circuit.

Input 18*b*K' is connected to the output 18*e*J' of the control circuit 18J, input 18*c*K' is connected to output 16*n*K' of the detector 16K', input 18*d*K' is connected to the output 18*f*L' of the control circuit 18L', output 18*e*K' is connected to the control line of the NULL injector gates in logical circuitry 14K' and to the control line of the intersection gates in intersection gate network 20K', and output 18*f*K' is connected to the input 18*d*J' of control circuit 18J'.

The input present in the alternate control circuit which is not present in the previously described control circuit is input 18*z*K'. This input is connected to the VALID output of the associated detector, that is, input 18*z*K' is connected to output 16*v*K' of the detector 16K'. It should be particularly noted that the previously described control circuit had no input connected to the VALID output of the detector in the associated section whereas this alternate embodiment does have an input which is connected to the VALID output of detector in the associated section.

The preferred alternate control circuit 18K' operates as follows: As a starting point we will assume that trigger 910' is in the "on" state thereby activating line 910*c*', that trigger 920' is in the "off" state thereby activating output 18*e*K', and deactivating output 18*f*K'. The manner in which the triggers are switched to this state will be explained later. Since output 18*e*K' is active, the circuitry in section K' is being switched to the NULL state. After all of the circuitry in section K' is in the NULL state, input 18*c*K' is activated. Since line 910*c*' is activated, when input 18*c*K' is activated the output of AND circuit 913' changes the state of trigger 920' thereby deactivating output 18*e*K' and activating output 18*f*K'. Since all the circuitry in section K' is now in the NULL state and since input 18*e*K' has been terminated, a new batch of data will be gated into section K' as soon as the outputs of section J' go from the NULL to a VALID state.

The reason for this is that as explained above with the alternate type of intersection gate shown in FIGURE 11 data is only gated through an intersection gate when both control line 18*d*K' is inactivated and the outputs of the previous section are not in the NULL state.

After a batch of data appears at the output of section J' and is gated into the section K', input 18*c*K' is deactivated and input 18*z*K' is activated. If the control line 18*e*L' is inactivated thereby allowing the data to be immediately gated into section L', input 18*d*K' will be activated and the output of AND circuit 914 will change the state of trigger 920' thereby again activating output 18*e*K' and deactivating output 18*f*K'.

Trigger 910' is provided to take care of the situation which occurs when section K' operates faster than section J'. After a batch of data is transferred from section J' to section K', output 18*f*K' is activated and thereafter the control circuit in section J' activates input 18*b*K'. Input 18*b*K' remains active until all of the circuitry in section J' is set to the NULL state. If after a batch of data is transferred from section J' to section K', some of the outputs of section K' become valid thereby deactivating input line 18*c*K' before input line 18*b*K' is deactivated AND circuit 912' will switch trigger 910' to the "off" state thereby deactivating line 910*c*' and halting further operations until the nullification of the circuitry in section J' is complete. Sometime after all of the circuitry in section J' has been nullified input 18*b*K' is terminated thereby activating the output of NOT circuit 916' changing the state of trigger 910' and activating line 910*c*'. Thereafter when all the outputs of section K' are set to the NULL state, input 18*c*K' is activated, AND circuit 913' changes the state of trigger 920' thereby activating line 920*c*' and output 18*f*K' and deactivating output 18*e*K'.

The difference in structure between the alternate intersection gate shown in FIGURE 11 and the previously described intersection gate shown in FIGURE 4 will now be explained. The difference is that the intersection gate shown in FIGURE 11 has a NULL line in input 211*a*'. This line is connected in series with an additional control line on cryotron 620'. In the intersection gate shown in FIGURE 4, cryotron gating element 421' was made resistive whenever line 211*e*' was deactivated. With the alternate intersection gate shown in FIGURE 11, the gating element 421' of cryotron 420' is made resistive only when line 211*e*' is deactivated and there is no current in the NULL line of input 211*a*'. Hence, as previously explained, information is only gated through the gate when line 211*e*' is inactive and the NULL line in input 211*a*' is inactive.

*Alternate embodiment of OR circuit*

An alternate embodiment for an OR circuit capable of handling NULL conditions is shown in FIGURE 12. This alternate OR circuit is useful where one expects that a particular one of the inputs to the OR circuit will become valid before the other input to the OR circuit becomes valid. With an OR circuit one knows that if one of the inputs to the OR circuit is in a valid ONE state the output of the circuit must of necessity be ONE. In the circuit previously described so long as either of the inputs to the OR circuit is in the NULL state the output of the circuit will remain in the NULL state. With the circuit shown in FIGURE 12 if the ONE line in the A input is activated, the ONE line in the output will be activated irrespective of which line in the B input is active.

Such an OR circuit could be advantageously used in place of OR circuits 347, 349, 351 and 353 which are shown in FIGURES 3*a* and 3*b*. Each of the above OR circuits has two inputs, one of which represents a fast carry and the other of which represents a ripple carry. For example, OR circuit 351 has one input from NULL injector gate 367 which represents a fast carry and one input from AND circuit 334 which represents a ripple carry. Whenever the fast carry is in the valid ONE state the output of the OR circuit should be in the valid ONE state irrespective of the state of the second input. Hence, the fast OR circuit shown in FIGURE 12 could advantageously be used in place of the above OR circuit 351.

In order to show the correspondence between the OR circuit shown in FIGURE 6A and the fast OR circuit shown in FIGURE 12, the components of the circuit shown in FIGURE 12 are designated with the same designations as the corresponding components in FIGURE 6A;

however, the numerals used to designate components in FIGURE 12 are followed by a prime.

The only differences between the circuit shown in FIGURE 12 and the circuit shown in FIGURE 6A is that in the circuit shown in FIGURE 12, cryotron 621' has an additional control line therein designated 625'. Control line 625' is connected in series with the ONE line in input A. Hence, any time the ONE line in input A is active, gating element 621' is made resistive thereby switching current out of the NULL line in output C. Since there is current in the ONE line of input A, control 634' will be active thereby making cryotron gating element 631 superconducting and control line 644' will be inactive thereby making cryotron gating element 641' resistive, hence, the current from current source 660' will flow in the ONE line in output C.

The result is that whenever there is current in the ONE line of input A, current will flow in the ONE line of output C irrespective of the state of input B.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An asynchronous computing device comprising a plurality of sections for processing data, each of said sections having a plurality of inputs and a plurality of outputs, each of said outputs having three states to respectively represent binary ONE, binary ZERO and NULL states, detector means associated with each section for interrogating the outputs thereof and for indicating when all of the outputs of the associated section are in the NULL state and for indicating when none of the outputs of the associated section are in the NULL state, control means responsive to said detector means for controlling the transfer of data between sections.

2. The computing device recited in claim 1 wherein said control means includes separate control means for each particular section, each of said separate control means including means responsive to the detector means in said particular section and in a preceding section for initiating the transfer of data from said preceding section to said particular section when the preceding section has indicated that it has completed operating upon a batch of data and the particular section has indicated that it is ready to receive a new batch of data.

3. The computing device recited in claim 1 wherein said control means includes separate control means for each particular section, each of said separate control means including means responsive to the detector means in said particular section and in a preceding section for initiating the transfer of data between said preceding section and said particular section when (1) all of the outputs of the particular section are in the NULL condition (2) the particular section is not then processing a batch of data (3) none of the output of the preceding section are in the NULL state and (4) the batch of data indicated by the outputs of the preceding section has not previously been transferred to the particular section.

4. The computing device recited in claim 1 wherein said control means includes separate control means for each particular section, each of said separate control means including means responsive to the detector means associated with said particular section and to the detector means associated with the preceding section for inhibiting the transfer of data from the preceding section into said particular section when any of the circuitry in the associated section is not in the NULL state.

5. The computing system recited in claim 1 wherein said control means includes separate control means for each particular section, each of said separate control means including means responsive to the detector means associated with said particular section, to the detector means associated with the preceding section and to the separate control means in the following section for inhibiting the transfer of data into the associated section if all the circuitry in the associated section is not in the NULL state, and for setting the circuitry in the associated section to the NULL state after a batch of data has been gated from the associated section into the following section.

6. An asynchronous computing device comprising, a plurality of sections, each including a logical network having inputs and outputs, each of said logical networks including means for generating a batch of data at its outputs in response to a batch of data supplied to its inputs, each input of each logical network having binary ONE and binary ZERO states and each output of each logical network having binary ONE, binary ZERO and NULL states, an intersection gate network connected to the inputs of each logical network, said intersection gate network having a plurality of inputs and a plurality of outputs, each input having a binary ONE and binary ZERO states and each output having binary ONE, binary ZERO and NULL states, each intersection gate network having a latching line input and a control line input, means for setting the outputs thereof to the NULL state when said control line is activated, for making the outputs responsive to the state of the inputs when said control line is inactive and said latching line is active, and for making the outputs nonresponsive to changes in said inputs when said latching line is inactive, detector means for each section for detecting when all of the outputs of the associated logical section are in the NULL condition and for detecting when all of the outputs of the associated logical section are either in the ONE or the ZERO states, control means responsive to said detector means for controlling the transfer of batches of data between sections.

7. An asynchronous computing device comprising, a plurality of sections each including a logical network having inputs and outputs, each of said logical networks including means for generating a batch of data at its outputs in response to a batch of data supplied to its inputs, each input of each logical network having binary ONE and binary ZERO states and each output of each logical network having binary ONE, binary ZERO and NULL states, an intersection gate network connected to the inputs of each logical network, said intersection gate network having a plurality of inputs and a plurality of outputs, each input having a binary ONE and binary ZERO states and each output having binary ONE, binary ZERO and NULL states, each intersection gate network having a latching line input and a control line input, means for setting the outputs thereof to the NULL state when said control line is activated, for making the outputs responsive to the state of the inputs when said control line is inactive and said latching line is active, and for making the outputs nonresponsive to changes in said inputs when said latching line is inactive, detector means for each section for detecting when all of the outputs of the associated logical section are in the NULL condition and for detecting when all of the outputs of the associated logical section are either in the ONE or the ZERO states, control means responsive to the detector means in a first and a second section for controlling the transfer of data from said first section to said second section when the first section has indicated that it has completed operating upon a batch of data and the second section has indicated that it is ready to receive a new batch of data.

8. An asynchronous computing device comprising, a plurality of sections each including a logical network having inputs and outputs, each of said logical networks including means for generating a batch of data at its outputs in response to a batch of data supplied to its inputs, each input of each logical network having binary ONE and binary ZERO states and each output of each logical network having binary ONE, binary ZERO and NULL states, an intersection gate network connected to the inputs of each logical network, said intersection gate network having a plurality of inputs and a plurality of outputs, each input having a binary ONE and binary ZERO states and each output having binary ONE, binary ZERO and NULL states, each intersection gate network having a latching line input and a control line input, means for setting the outputs thereof to the NULL state when said control line is activated, for making the outputs responsive to the state of the inputs when said control line is inactive and said latching line is active, and for making the outputs nonresponsive to changes in said inputs when said latching line is inactive, detector means for each section for detecting when all of the outputs of the associated logical section are in the NULL condition and for detecting when all of the outputs of the associated logical section are either in the ONE or the ZERO states, control means responsive to the detector means in a first section and in a second section for controlling the transfer of data between said first section and said second section when (1) all of the outputs of the second section are in the NULL condition, (2) the particular section is not then processing a batch of data, (3) none of the outputs of the first section are in the NULL state and (4) the batch of data indicated by the outputs of the first section has not previously been transferred to the second section.

9. The device of claim 6 where each intersection gate network comprises, a plurality of intersection gates having an input having at least two states representing binary ONE and binary ZERO states, and an output having three states representing NULL, binary ONE and binary ZERO states, a latching line, a control line, means for setting said output to said NULL state when current is flowing in said control line, means for setting said output to said ONE state when no current is flowing in said control line, current is flowing in said latching line and said input is in said ONE state, means for setting said output to the ZERO state when no current is flowing in said control line, current is flowing in said latching line and said input is in said ZERO state and, means for making the state of said output nonresponsive to further changes in the state of said input when no current is flowing in said latching line.

10. The device of claim 7 wherein each intersection gate network comprises a plurality of intersection gates having, an input having a least two states representing binary ONE and binary ZERO states, and an output having three states representing NULL, binary ONE and binary ZERO states, a latching line, a control line, means for setting said output to said NULL state when current is flowing in said control line, means for setting said output to said ONE state when no current is flowing in said control line, current is flowing in said latching line, and said input is in said ONE state, means for setting said output to the ZERO state when no current is flowing in said control line, current is flowing in said latching line and said input is in said ZERO state and, means for making the state of said output nonresponsive to further changes in the state of said input when no current is flowing in said latching line.

11. The device of claim 8 wherein each intersection gate network comprises a plurality of intersection gates having, an input having at least two states representing binary ONE and binary ZERO states, and an output having three states representing NULL, binary ONE and binary ZERO states, a latching line, a control line, means for setting said output to said NULL state when current is flowing in said control line, means for setting said output to said ONE state when no current is flowing in said control line, current is flowing in said latching line, and said input is in said ONE state, means for setting said output to the ZERO state when no current is flowing in said control line, current is flowing in said latching line and said input is in said ZERO state, and, means for making the state of said output nonresponsive to further changes in the state of said input when no current is flowing in said latching line.

12. A multiplication device for respectively multiplying a plurality of multiplicands by a plurality of multipliers, comprising, a plurality of sections, each section including means for receiving a multiplicand, selected digits of a multi-digit multiplier, and a partial sum, means for examining a selected digit of said multiplier and for generating the sum of said partial sum and the product of said selected multiplier digit and of said multiplicand, detector means associated with each section for determining when the associated section is in the process of performing a multiplication when the associated section is not in the process of performing a multiplication and when the associated section has completed performing a multiplication, control means responsive to the detector means in a first and the detector means in a second section for controlling the transfer of data between sections.

13. A multiplication device for respectively multiplying a plurality of multiplicands by a plurality of multipliers, comprising, a plurality of sections, each section including means for receiving a multiplicand, selected digits of a multi-digit multiplier, and a partial sum, means for examining a selected digit of said multiplier and for generating the sum of said partial sum and the product of said selected multiplier digit and of said multiplicand, detector means associated with each section for determining when the associated section is in the process of performing a multiplication, when the associated section is not in the process of performing a multiplication and when the associated section has completed performing a multiplication, control means responsive to the detector means in a first and the detector means in a second section for controlling the transfer of data from said first section to said second section when the first section has indicated that it has completed operating upon a batch of data and said second section has indicated that it is ready to receive a new batch of data.

14. A multiplication device for respectively multiplying a plurality of multiplicands by a plurality of multipliers, comprising, a plurality of sections, each section including means for receiving a multiplicand, selected digits of a multidigit multiplier, and a partial sum, means for examining a selected digit of said multiplier and for generating the sum of said partial sum and the product of said selected multiplier digit and of said multiplicand, detector means associated with each section for determining when the associated section is in the process of performing a multiplication, when the associated section is not in the process of performing a multiplication and when the associated section has completed performing a multiplication, control means responsive to the detector means in a first and the detector means in a second section for controlling the transfer of data betwen said first section and said second section when (1) all of the outputs of the second section are in the NULL condition, (2) the particular section is not then processing a batch of data, (3) none of the outputs of the first section are in the NULL state and (4) the batch of data indicated by the outputs of said first section has not previously been transferred to said second section.

15. An asynchronous multiplication device comprising a plurality of sections, each section including a logical network having a first plurality of input means for receiving a multidigit multiplicand, a second plurality of inputs for receiving selected digits of a multidigit multiplicand, a third plurality of inputs for receiving a multidigit partial sum, a plurality of outputs, and means for examining a selected digit of said multiplier and for generating the sum of said partial sum and the product of said selected multiplier digits and of said multiplicand, each input and each output of each logical network having binary ONE, binary ZERO and NULL states, an intersection gate network connected to the inputs of each logical network, said intersection gate network having a plurality of inputs and a plurality of outputs, each input having a binary ONE and binary ZERO states and each output having binary ONE, binary ZERO and NULL states, each intersection gate network having a latching line input and a control line input, means for setting each of the outputs thereof to the NULL state when said control line is activated, for making the outputs responsive to the state of the inputs when said control line is inactive and said latching line is active, and for making the outputs nonresponsive to changes in said inputs when said latching line is inactive, detector means for each logical section for detecting when all of the outputs of the associated logical network are in the NULL condition and for detecting when all of the outputs of the associated logical network are either in the ONE or the ZERO states, control means responsive to said detector means for controlling the transfer of batches of data between sections.

16. An asynchronous multiplication device comprising a plurality of sections, each section including a logical network having a first plurality of input means for receiving a multidigit multiplicand, a second plurality of inputs for receiving selected digits of a multidigit multiplier, third plurality of inputs for receiving multidigit partial sum, a plurality of outputs and means for examining a selected digit of said multiplier and for generating the sum of said partial sum and the product of said selected multiplier digits and of said multiplicand, each input and each output of each logical network having binary ONE, binary ZERO and NULL states, an intersection gate network connected to the inputs of each logical network, said intersection gate network having a plurality of inputs and a plurality of outputs, each input having a binary ONE and binary ZERO states and each output having binary ONE, binary ZERO and NULL states, each intersection gate network having a latching line input and a control line input, means for setting each of the outputs thereof to the NULL state when said control line is activated, for making the outputs responsive to the state of the inputs when said control line is inactive and said latching line is active, and for making the outputs nonresponsive to changes in said inputs when said latching line is inactive, detector means for each logical section for detecting when all of the outputs of the associated logical network are in the NULL condition and for detecting when all of the outputs of the associated logical network are either in the ONE or the ZERO states, control means for each particular section, each of said separate control means including means responsive to the detector means in said particular section and in a preceding section for initiating the transfer of data from said preceding section to said particular section when the preceding section has indicated that it has completed operating upon a batch of data and the particular section has indicated that it is ready to receive a new batch of data.

17. An asynchronous multiplication device comprising a plurality of sections, each section including a logical network having a first plurality of input means for receiving a multidigit multiplicand, a second plurality of inputs for receiving selected digits of a multidigit multiplicand, a third plurality of inputs for receiving a multidigit partal sum, a plurality of outputs and means for examining a selected digit of said multiplier and for generating the sum of said partial sum and the product of said selected multiplier digits and of said multiplicand, each input and each output of each logical network having binary ONE, binary ZERO and NULL states, an intersection gate network connected to the inputs of each logical network, said intersection gate network having a plurality of inputs and a plurality of outputs, each input having a binary ONE and binary ZERO states and each output having binary ONE, binary ZERO and NULL states, each intersection gate network having a latching line input and a control line input, means for setting each of the outputs thereof to the NULL state when said control line is activated, for making the outputs responsive to the state of the inputs when said control line is inactive and said latching line is active, and for making the outputs nonresponsive to changes in said inputs when said latching line is inactive, detector means for each logical section for detecting when all of the outputs of the associated logical network are in the NULL condition and for detecting when all of the outputs of the associated logical network are either in the ONE or the ZERO states, control means for each particular section, each of said control means including means responsive to the detector means in said particular section and in a preceding section for initiating the transfer of data between said preceding section and said particular section when (1) all of the outputs of the particular section are in the NULL condition (2) the particular section is not then processing a batch of data (3) none of the outputs of the preceding section are in the NULL state and (4) the batch of data indicated by the outputs of the preceding section has not previously been transferred to the particular section.

18. The asynchronous multiplication device recited in claim 15 wherein each intersection gate network comprises a plurality of intersection gates having an input having at least two states representing binary ONE and binary ZERO states, and an output having three states representing NULL, binary ONE and binary ZERO states, a latching line, a control line, means for setting said output to said NULL state when current is flowing in said control line, means for setting said output to said ONE state when no current is flowing in said control line, current is flowing in said latching line, and said input is in said ONE state, means for setting said output to the ZERO state when no current is flowing in said control line, current is flowing in said latching line and said input is in said ZERO state, and, means for making the state of said output nonresponsive to further changes in the state of said input when no current is flowing in said latching line.

19. The asynchronous multiplication device recited in claim 15 wherein each of said logical networks includes a plurality of logical circuits interconnected in series and parallel to generate particular logical functions, said logical circuits being interconnected between a plurality of inputs each of which has three states to indicate NULL, binary ONE and binary ZERO states and a plurality of outputs each of which has three states to indicate NULL, binary ONE and binary ZERO states, a plurality of NULL injector gates each having an input capable of assuming three states to indicate NULL, binary ONE and binary ZERO states and an output capable of assuming three states to indicate NULL, binary ONE and binary ZERO states, and a control line, said output being responsive to the state of said input when no current is flowing in said control line and said output being set to the NULL state when current is flowing in said control line, said NULL injector gates being interposed in said series connections of logical circuit whereby no series connection of logical circuits has more than a predetermined number of logical circuits connected in series without a NULL injector gate interposed therebetween whereby all of the circuits in said logical network can be set to the NULL state in the time required for a signal to propagate through said predetermined number of logical circuits.

20. A multiplication device for respectively multiplying a plurality of multiplicands by a plurality of multipliers, comprising, a plurality of sections, each section including means for receiving a multidigit multiplicand, selected digits of a multidigit multiplier, and a multidigit partial sum, means for examining a selected digit of said multiplier and for generating the sum of said partial sum and the product of said selected multiplier digit and of said multiplicand, detector means associated with each section for determining when the associated section is in the process of performing a multiplication when the associated section is not in the process of performing a multiplication and when the associated section has completed performing a multiplication, control means responsive to the detective means in a first section and the detector means in a second section for controlling the transfer of data between said first section and said second section by inhibiting the transfer of data into said second section if any of the circuitry in the associated section is in a valid state.

References Cited by the Examiner

UNITED STATES PATENTS

| | | | |
|---|---|---|---|
| 3,052,412 | 9/1962 | Baskin | 235—164 |
| 3,069,085 | 12/1962 | Cooper et al. | 235—164 |
| 3,069,566 | 12/1962 | Reach | 307—88.5 |
| 3,087,076 | 4/1963 | Pingry | 307—88.5 |

ROBERT C. BAILEY, *Primary Examiner.*

MALCOLM A. MORRISON, *Examiner.*

E. M. RONEY, *Assistant Examiner.*